United States Patent [19]

Kostreski et al.

[11] Patent Number: 5,852,612

[45] Date of Patent: *Dec. 22, 1998

[54] TERMINAL FOR RECEIVING SIMULCAST DIGITAL VIDEO PROGRAMS

[75] Inventors: Bruce Kostreski, Wheaton, Md.; Allan Schneider, Falls Church, Va.; Kamran Sistanizadeh, Arlington, Va.; W. Tim Campbell, Alexandria, Va.

[73] Assignee: Bell Atlantic Network Services, Inc., Arlington, Va.

[ * ] Notice: The term of this patent shall not extend beyond the expiration date of Pat. No. 5,651,010.

[21] Appl. No.: 555,373

[22] Filed: Nov. 9, 1995

Related U.S. Application Data

[63] Continuation-in-part of Ser. No. 441,976, May 16, 1995, Pat. No. 5,559,808, which is a continuation-in-part of Ser. No. 405,558, Mar. 16, 1995, Pat. No. 5,651,010.

[51] Int. Cl.$^6$ ........................................................ H04N 5/21
[52] U.S. Cl. .............................. 370/537; 375/200; 348/21
[58] Field of Search ..................... 370/319, 291, 370/320, 441, 537, 485, 486, 487; 375/229, 299, 266, 347, 348, 200, 202, 205, 206, 340, 349; 455/3.1, 3.2, 6.1, 6.2, 6.3; 348/6–8, 21, 607, 387, 608, 472, 611, 614

[56] References Cited

U.S. PATENT DOCUMENTS

| | | |
|---|---|---|
| 2,629,816 | 2/1953 | Rabuteau . |
| 3,836,726 | 9/1974 | Wells et al. . |
| 4,255,814 | 3/1981 | Osborn . |
| 4,696,051 | 9/1987 | Breeden . |
| 4,696,052 | 9/1987 | Breeden . |
| 4,718,109 | 1/1988 | Breeden et al. . |
| 5,038,403 | 8/1991 | Leitch . |
| 5,117,503 | 5/1992 | Olson . |
| 5,119,196 | 6/1992 | Ayanoglu et al. ........................ 348/607 |
| 5,121,208 | 6/1992 | Citta et al. ............................... 348/607 |
| 5,127,101 | 6/1992 | Rose, Jr. . |
| 5,128,925 | 7/1992 | Dornstetter et al. . |
| 5,230,086 | 7/1993 | Saul . |
| 5,231,494 | 7/1993 | Wachob . |
| 5,239,671 | 8/1993 | Linquist et al. . |
| 5,239,672 | 8/1993 | Kurby et al. . |
| 5,243,598 | 9/1993 | Lee . |
| 5,268,933 | 12/1993 | Averbuch . |
| 5,274,666 | 12/1993 | Dowdell et al. . |

(List continued on next page.)

OTHER PUBLICATIONS

Caffrey, J., "MMDS (Wireless Cable): An Alternative Delivery Medium for Digital Terrestrial Television," International Broadcasting Convention, 16–20 Sep. 1994, Conference Publication No. 397. ©IEE, 1994.

Lambert, Peter, "FM Wireless TV to Bite the Apple," Broadcasting, Dec. 21, 1992, pp. 46–47.

*Primary Examiner*—Chau Nguyen
*Attorney, Agent, or Firm*—McDermott, Will & Emery

[57] ABSTRACT

An arrangement (apparatus and method) for obtaining a single copy of a received signal from a simulcast broadcast area. Within a desired service area, multiple transmitters at separately located sites simultaneously broadcast the same multi-channel, multi-program signal. Broadcast waves from the transmitters propagate throughout substantially overlapping portions of the service area. Each such channel carries a multiplexed digital data stream containing packets of information for a plurality of programs, e.g. television programs. A receiver system comprises an antenna adapted to receive direct transmissions from two or more of the transmitters as well as multipath signals from two or more of the transmitters. To compensate for the potentially interfering signal receptions, the terminal device includes a delay processor, such as an adaptive delay equalizer or a rake receiver. The maximum delay processing window of the delay processor is at least as long as the difference in propagation time to the receiver from two of the transmitters and preferably exceeds that time by some amount chosen to permit processing of multipath delay signals from the more distant transmitter.

19 Claims, 11 Drawing Sheets

U.S. PATENT DOCUMENTS

| | | |
|---|---|---|
| 5,327,581 | 7/1994 | Goldberg . |
| 5,355,529 | 10/1994 | Linquist et al. . |
| 5,365,569 | 11/1994 | Witsaman et al. . |
| 5,369,682 | 11/1994 | Witsaman et al. . |
| 5,404,575 | 4/1995 | Lehto . |
| 5,414,734 | 5/1995 | Marchetto et al. . |
| 5,418,818 | 5/1995 | Marchetto et al. . |
| 5,423,058 | 6/1995 | Cudak et al. . |
| 5,423,059 | 6/1995 | LoGalbo et al. . |
| 5,526,034 | 6/1996 | Hoarty et al. ............................. 348/7 |

TERMINAL FOR RECEIVING SIMULCAST DIGITAL VIDEO PROGRAMS

CROSS-REFERENCE TO RELATED APPLICATION

This application is a continuation in part of U.S. patent application Ser. No. 08/441,976 filed May 16, 1995, now U.S. Pat. No. 5,559,808, entitled "SIMULCASTING DIGITAL VIDEO PROGRAMS" which is continuation in part of U.S. patent application Ser. No. 08/405,558 filed Mar. 16, 1995, now U.S. Pat. No. 5,651,010, entitled "SIMULTANEOUS OVERLAPPING BROADCASTING OF DIGITAL PROGRAMS", the disclosures of which are incorporated herein in its entirety by reference.

TECHNICAL FIELD

The present invention relates to wireless reception of program information, e.g. video, audio and data. More specifically, the present invention relates to simultaneous distribution of multiple RF channels from separately located transmitters, each RF channel carrying a digital transport stream containing multiplexed data relating to a plurality of different programs, and to terminal devices receiving programs from such a distribution system.

BACKGROUND ART

"Wireless cable" is a term usually used to refer to a multi-channel video distribution medium that resembles franchise cable television, but which uses microwave channels rather than coaxial cable or wire to transmit programming to the subscriber. Programming for wireless cable systems is received at the headend of the wireless cable system in the same manner as it is for landline based cable television. These programs are then retransmitted, utilizing the high end of the Ultra High Frequency (UHF) portion of the microwave radio frequency spectrum (2.1 to 2.7 GHz), by a microwave transmitting antenna located on a tower or other tall structure to small antennas on subscriber rooftops, typically within a 40 mile radius. As a general matter, the transmission of wireless frequencies requires clear line-of-sight (LOS) between the transmitter and the receiving antenna. Buildings, dense foliage and topography can cause signal interference which can diminish or block signals. Certain LOS constraints can be reduced by increasing transmission power and using engineering techniques such as pre-amplifiers and signal repeaters.

To the subscriber, wireless cable operates as a cable look-alike service. At the subscriber's location, microwave signals are received by an antenna, down-converted and passed through conventional coaxial cable to a descrambling converter located on top of a television set. The signals are converted at the antenna location to lower frequencies in order to be carried over conventional in-house cable to a converter box, decoded and then output to a standard television set. Because wireless cable signals are transmitted over the air rather than through underground or above-ground cable networks, wireless systems are less susceptible to outages and are less expensive to operate and maintain than franchise cable systems. Most service problems experienced by wireless cable subscribers are home-specific rather than neighborhood-wide, as is frequently the case with franchise cable systems.

The evolution of wireless cable may be briefly summarized as follows. Wireless cable technology has existed in a single channel version for commercial purposes since the 1970's and had been available even longer for educational use. In mid-1983, the FCC, invoking the need to promote competition with conventional cable television systems, established a change in the rules for using a portion of the microwave spectrum previously designated for educational use. In the past, 28 microwave channels had been available to accredited and non-profit educational organizations for educational use exclusively by Instructional Television Fixed Service (ITFS) operators. Rules reallocated eight of those channels for outright commercial use, and educational organizations were permitted to lease excess hours to commercial operators on the remaining 20 channels. In any local market, this makes it possible for a commercial operator to combine any or all of those 28 channels with five other channels already available for commercial use. Under current FCC rules, the available spectrum results in a maximum of 33 analog channels. This number of 'wireless cable' channels is less than the number offered on many competing franchise type cable television systems.

The 33 channels potentially available to wireless cable operators thus are subdivided into two types of channels. Twenty channels are referred to as ITFS. The remaining 13 channels are generally referred to as Multi-channel Multi-point Distribution Service (MMDS).

Since 1983 spectrum blocks in the 2.1–2.7 GHz range have been allocated for the purpose of delivering video content from a single transmit site to multiple receive locations. A total of 198 Mhz has been allocated for downstream transmissions for the wireless cable service. The channelization and transmission modulation (6 Mhz amplitude modulation/vestigial side band) are equivalent to broadcast TV or cable but up-converted to microwave frequencies.

The current UHF spectrum was originally licensed in blocks of four video channels each separately licensed, with each block allocated to a specific purpose. Five groups, each with four channels, were allocated to Instructional Television Fixed Service (ITFS). ITFS spectrum was initially made available only to educational institutions. Two groups of four channels were made available to anyone wishing to provide an alternative multi-channel video program service. The final four channels were licensed individually to institutions for the purpose of providing a private video network. Over time, the FCC relaxed some of these operational rules. Through licensing and leasing arrangements, the FCC now allows all of the channels to be aggregated for the purpose of providing an alternative to cable television.

In many ways, current typical UHF wireless TV is equivalent to a low tier franchise cable television system (i.e. having relatively few channels), with the only real difference lying in the medium used to transport signals from the headend to the customer. Functionally identical headend equipment is utilized in both systems. In the case of UHF service, signals leave the headend via a microwave transmitter. With cable television, the same signals leave the headend on fiber or coaxial cable facilities.

Wireless cable technology provides a relatively low cost medium to transmit video and does not require extensive coaxial cable networks, amplifiers and related equipment. The three major advantages of such service are variable cost technology where capital is spent in establishing cash flows, manageable financial risk because of variable costs, and the possibility of establishing broad based market entry more quickly than is feasible with wireline based video systems. Wireless cable systems are attractive to potential subscribers not yet served by franchise cable operators and can provide customers in cabled areas with an economical alternative to both existing franchise cable and satellite television reception systems. However, the current analog technology presents several problems which have severely limited actual use of 'wireless cable'.

In a typical prior art system, such as shown in FIG. 1, a headend system H receives up to a maximum of 33 analog television program signals from a variety of satellite downlink receivers and other types of receivers, in the exact same manner as for a cable television system. The headend system H frequency multiplexes those television program signals into a combined spectrum signal in the 50–450 Mhz range. This combined signal has a frequency distribution similar to that found on a cable television network. The headend system upconverts the combined spectrum signal to the UHF frequency range, typically centered around 2.6 GHz. The headend system supplies the UHF signal to a single transmitter antenna tower T which broadcasts the signal to subscribers who each have an individual home receiving system. Subscribers can call in to the headend to order pay-per-view events via the telephone network, and the headend transmits codes to the subscribers systems to enable descrambling of encoded pay-per-view programs.

FIG. 1A shows a typical service area for a wireless cable type system of the type shown in FIG. 1. In accord with relevant regulations, the wireless cable operator has a protected or 'primary' reception area P. At the relevant frequencies here under consideration, the primary area P is a circle having a radius of 15 miles from the operator's transmitter T. Within this area, the operator is guaranteed that there will be no interference with his transmissions on the assigned frequency channel(s). However, at the allowable power levels, the transmissions from antenna tower T will propagate out over a secondary area S having a radius of up to 40 miles. Within the secondary area, some locations will receive sufficient signal strength to utilize the wireless cable services.

UHF signals in the relevant frequency band arrive at the customer location by direct line-of-sight (LOS) transmission. Typically an elliptical dish shaped antenna 18–36 inches long, formed of parallel curved elements, is aimed from the subscriber location to receive the strongest signal from the transmitter. The captured signals are downconverted at the antenna from the microwave band to the broadcast band and transmitted via coaxial wiring into the house. For scrambled signals (the typical case), a set top converter functionally similar to a cable set top box is used. In many UHF installations, to conserve UHF capacity for premium services, a VHF/UHF off-air broadcast receive antenna is installed with the UHF antenna to pick up the local programming.

Propagation characteristics at the relevant UHF operating frequencies require line-of-sight (LOS) between the transmit and receive antennas for reliable service reception. Both natural obstructions such as hills and vegetation, and manmade obstructions such as buildings, water towers and the like, limit the actual households capable of receiving an LOS transmission. FIG. 1A also shows a simplified example of one such obstruction O. As illustrated, the obstruction O is within the primary reception area P. The obstruction blocks line-of-sight transmissions from transmitter antenna tower T in a radially extending blockage or shadow area B. Receiving systems within this area can not receive the transmissions from antenna T, and potential customers in that area B can not subscribe to the wireless cable services broadcast from that tower.

One solution to the blockage problem has been to provide repeaters. A repeater receives the primary transmission from tower T on the tower side of the obstruction, amplifies the signal if necessary, and retransmits the signal into the area of blockage. This may be an effective solution to one blockage or obstruction O, but in many major metropolitan areas there are many obstructions. The power levels of such repeaters tend to be low, and overcoming blockages due to distortions that result when amplifying combined RF channels caused by many different obstructions to the primary transmissions would require an inordinate number of repeaters. Also, because of delays and multipath effects, repeater transmissions may interfere with reception from the primary source in areas close to the blockage area B.

In the industry, a nominal figure for households reachable by LOS is 70%, even with a small, commercially practical number of repeaters. This projected number is based solely on computer models, not actual field measurements. It is believed that actual coverage by the current wireless cable technology in the UHF medium is considerably lower. Typical antenna heights required to achieve the present level of coverage in commercial service are 800-plus feet for transmitters and 30–60 feet for receivers. That means that many receive antennas must be mounted atop masts or nearby trees as an alternative to a rooftop mounting. While current regulations provide a 15 mile protected service area for MMDS, it is desired that effective system coverage for approximately 40–70% of the affected households may be achieved to a 40 mile radius from the transmitter antenna.

Besides signal blockage, several other propagation factors can affect reliable UHF service delivery. One factor is multi-path reflections of the desired signal arriving at the receiver by way of differing paths and therefore arriving with slight delay. For analog video signals, multi-path appears as ghost images on the viewer's TV. For digital signals, multi-path can cause intersymbol interference that results in multiple bit errors. In either case, near-coincident multi-path signals can cause a degree of signal cancellation that looks like additional propagation loss. Multi-path also results from reflections and diffraction.

Path fading is another significant coverage factor. Time-variant path fading can result from atmospheric effects, e.g., rain or temperature and pressure inversions. Rain can act to partially reflect or absorb the microwave signals. Weather inversions can result in an upward bending of the wave front due to refraction. There are engineering measures to mitigate the troublesome effects of time-variant path fading, such as suitable fade margins and antenna diversity.

In the paging and radio communication fields, various systems of sequencing and simulcasting have been proposed to achieve some increased coverage. Examples of typical proposed systems are illustrated in FIG. 2 and 3. The related systems are described in U.S. Pat. Nos. 3,836,726, issued September 1974 and 5,038,403 issued Aug. 6, 1991. FIG. 2 illustrates a system utilizing sequencing while FIG. 3 illustrates a system utilizing simulcasting. As can be seen, the aim is to cover maximum area with minimum area of signal overlap. Even if someone suggested application to UHF Wireless Cable type communications, such propagation fields would still exhibit the above noted problems due to obstructions, multi-path interference and fading.

Clearly a need exists for a broadcast system providing increased propagation coverage and reduced areas of blockages. Any such system should also provide an increased number of programs, without requiring additional spectrum allocation. The system should provide good signal quality throughout the entire reception area or service area. Accordingly, it is also desirable to minimize multipath interference and loss of service due to fading.

DISCLOSURE OF THE INVENTION

The present invention provides methods and apparatus to address the above stated needs. The present invention provides an improved arrangement for receiving transmitted signals in a reception area from an RF frequency simulcasting system that generates overlapping radio frequency propagation areas from corresponding transmitting sites. Each transmitting site substantially simultaneously transmits (simulcasts) a signal including multiplexed channels of compressed digital broadband data, such as video data.

According to the present invention, the method of receiving the transmitted signals from the RF frequency simulcasting system comprises the steps of receiving a signal containing a plurality of time delayed copies of the transmitted signal at a receiving site within the reception area, processing at least a portion of the received signal to acquire a single copy of a signal corresponding to a selected one of the multiplexed channels, and presenting a selected portion of the compressed digital broadband data contained in the acquired signal.

According to the present invention, the transmitting sites propagate the signal into substantially overlapping regions of at least a major portion or the intended reception area. Each of the transmitting sites will have a different propagation path to a subscriber premises. Hence, at the subscriber premises, a terminal device will receive a signal containing a plurality of time delayed copies of the transmitted signal. At least a portion of the received signal is processed to acquire a single copy of a signal corresponding to a selected one of the multiplexed channels, and information contained in the acquired signal is presented, e.g. in a form that is sensorially perceptible to a user. In the disclosed embodiments, the processing of multiple copies utilizes a delay processor, such as a delay equalizer, or a rake receiver for signals that are received as spread spectrum signals.

The delay processing technique of the present invention enables a receiver to acquire an optimum representation of the simulcast signals transmitted from the multiple transmitting sites. Thus, the receiver arrangement of the present invention enables subscriber receivers to receive a plurality of signals in a simulcast transmission system without the typical concerns of interference. Thus, the overlapping transmission or propagation areas in the simulcast transmission system enhance reception by reducing or eliminating blockage zones and effects of fading. This technique also limits the number of receivers effected by equipment outages at a transmission site. Typically, a directional receiving antenna can be aimed toward at least one strong line-of-sight transmission source.

To increase the number of programs broadcast by a system operating in accord with the above simulcasting method, each of the multiplexed channels carries a multiplexed stream of digital data representing a plurality of programs. The programs may be audio or data, but in the currently preferred embodiment, the programs comprise audio/visual information such as television programming. In such a television system, each program is digitally encoded into compressed digital data. A multiplexer combines the compressed digital data for a group of programs into one of the digital multiplexed data streams for transport through one of the channels. The presentation of one program to a user entails selecting one of the channels, selecting data from the multiplexed stream of digital data carried in that channel, and reproducing the selected data as the sensorially perceptible information, e.g. as an audio/visual output through a television set.

In addition, each transmitter may transmit a plurality of spread spectrum signals, whereby each spread spectrum signal is spread spectrum processed using a corresponding code sequence, and comprises a corresponding plurality of multiplexed channels of compressed digital broadband data. In this case, the receiver may selectively process one of the transmitted spread spectrum signals by selecting one of the code sequences stored at the receiver premises. Thus, a receiver may effectively increase the number of available channels for viewing by selecting one of the transmitted signals carrying a corresponding plurality of multiplexed channels.

In an exemplary implementation of the present invention, real-time encoders receive video programs and encode the information for those programs into packets of compressed digital data, e.g. in accord with a recognized video compression standard. The headend may also receive previously encoded video program material from other sources, such as a digital server or a digital transmission media. Multiplexers combine digital data for groups of programs into the multiplexed packet data streams. A digital modulator, such as a 64 or 256 QAM modulator, modulates each digitally multiplexed packet data stream for transport in one unique RF channel. A combined spectrum signal containing the RF channels is upconverted to place the channels into available frequency channels in the UHF range.

The combined spectrum signal is supplied to a plurality of microwave broadcast transmitters located at spaced apart sites about the service area or reception region. Appropriate delays are imposed in one or more of the lines to the transmitters so that the transmissions from all the transmitter antennae occur simultaneously and in phase with each other.

At the receiver site, an antenna receives a signal from at least one of the transmitters. Preferably, the antenna is a directional antenna aimed at one of the transmitters for line-of-sight reception therefrom. The signal from the receiving antenna is downconverted and supplied to a wireless signal processor. The wireless signal processor, typically part of an interface module connected by a cable to the downconverter, processes the received wireless signal to select one of the channels. The wireless signal processor effectively acquires a digital multiplexed data stream from the selected channel and supplies that data stream to a digital signal processor.

The digital signal processor selects packets of data relating to a selected one of the programs. The digital processing section processes the compressed, digitized data from those packets to produce signals presentable to a user. In the preferred embodiment, the digital signal processor produces signals to drive a standard television set.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

BEST MODE FOR CARRYING OUT THE INVENTION

The present invention is directed to the receiver arrangement for use in an improved simulcast transmission system for broadband data, such as video. A description of the transmission system itself will first be provided, followed by a detailed description of the receiver arrangement of the present invention for receiving the broadband data from the simulcast transmission system.

In accord with the present invention, groups of program signals are digitally encoded and compressed, and the compressed program streams are time division multiplexed into digital transport streams. Each digital transport stream is modulated and/or upconverted into one RF channel, in the preferred embodiment a channel in the high end of the ultra high frequency (UHF) microwave range (e.g. 2.1 to 2.7 GHz), although other frequency channels could be used. Separately located transmitters simultaneously broadcast an UHF frequency signal containing all of the channels. The transmitter antennae are located and the transmitter emission patterns are designed so that the waves from the transmitters propagate throughout substantially overlapping portions of the service area.

The overlapping portions may extend throughout the intended reception area. Existing regulations relating to the relevant frequency allocations specify a primary service area and a secondary service area. Within the primary service area, the regulations protect the licensee from any interference on the relevant frequency channel. In initial implementations of the present invention complying with such regulations, the overlapping areas of propagation from the multiple transmitters would cover at least a major portion of the primary reception area and preferably also cover a substantial portion of the secondary reception area. Some portions of the secondary reception area may be covered by propagating waves from only one of the transmitters. All of the primary and secondary areas would be covered by propagating waves from at least one of the transmitters.

Figure 4:
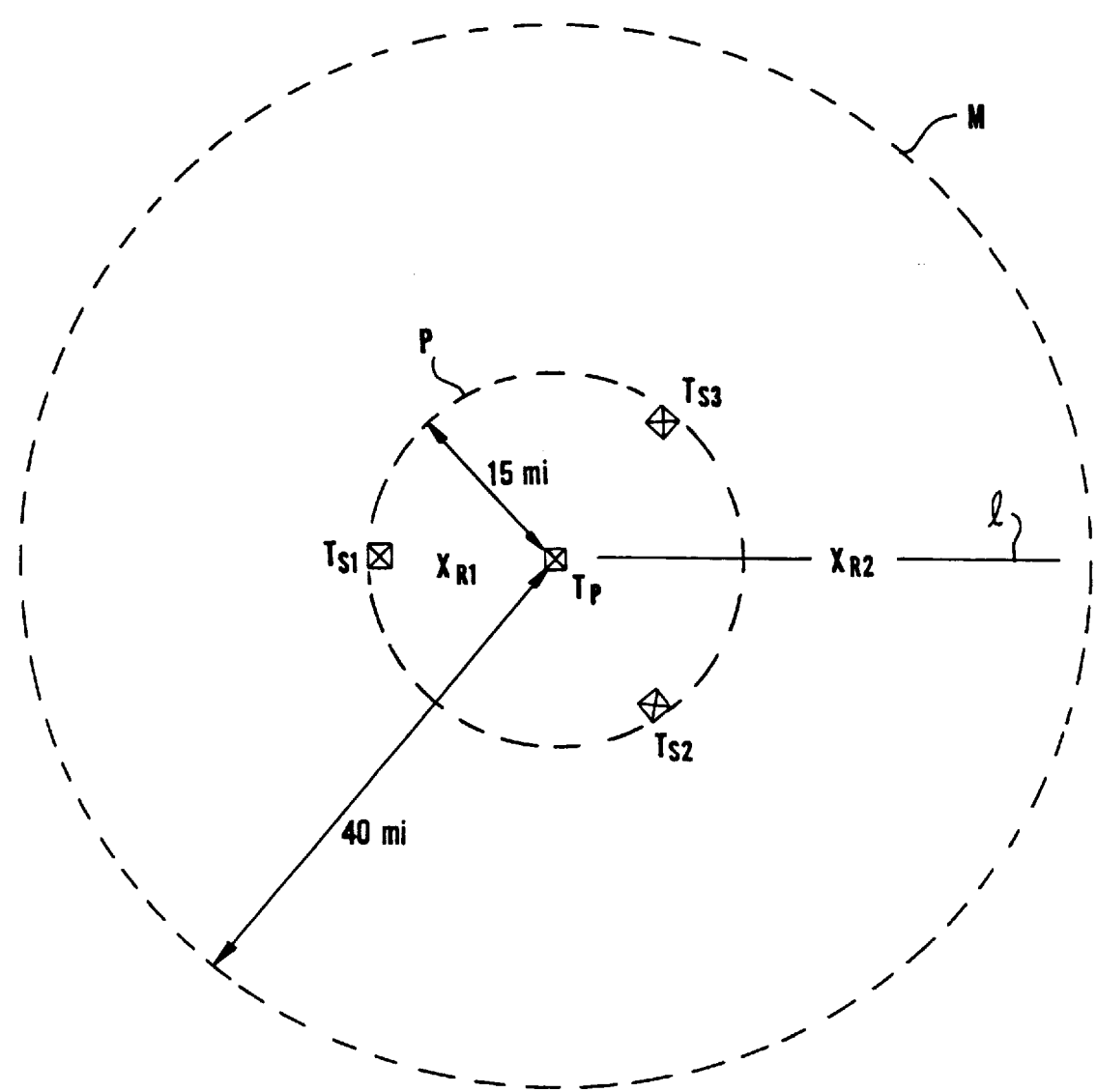
FIG. 4 depicts an exemplary service area and transmitter layout for simulcast transmissions into a receiving area.

Referring to FIG. 4, the circle P defines the Protected Area or primary area which may be serviced from a primary transmitting antenna $T_p$. At the present the radius of this circle is 15 miles. However, usable signal and acceptable reception generally occurs to a radius of 40 miles which is here defined by the circle M indicating the Maximum Area. The region between the 15 mile radius and the 40 mile radius forms a 'secondary' service area. According to the invention, all or part of the rights of the educational institution for ITFS service are leased. Also, licenses are aggregated, from companies currently licensed to use MMDS channels. Existing analog services (both ITFS and MMDS) are replaced by the new service which will provide the original programming desired by the ITFS institution in addition to a multiplicity of programs made possible by the system and method of the invention. In order to achieve this end, simulcasting is utilized in a unique manner.

Figure 1:
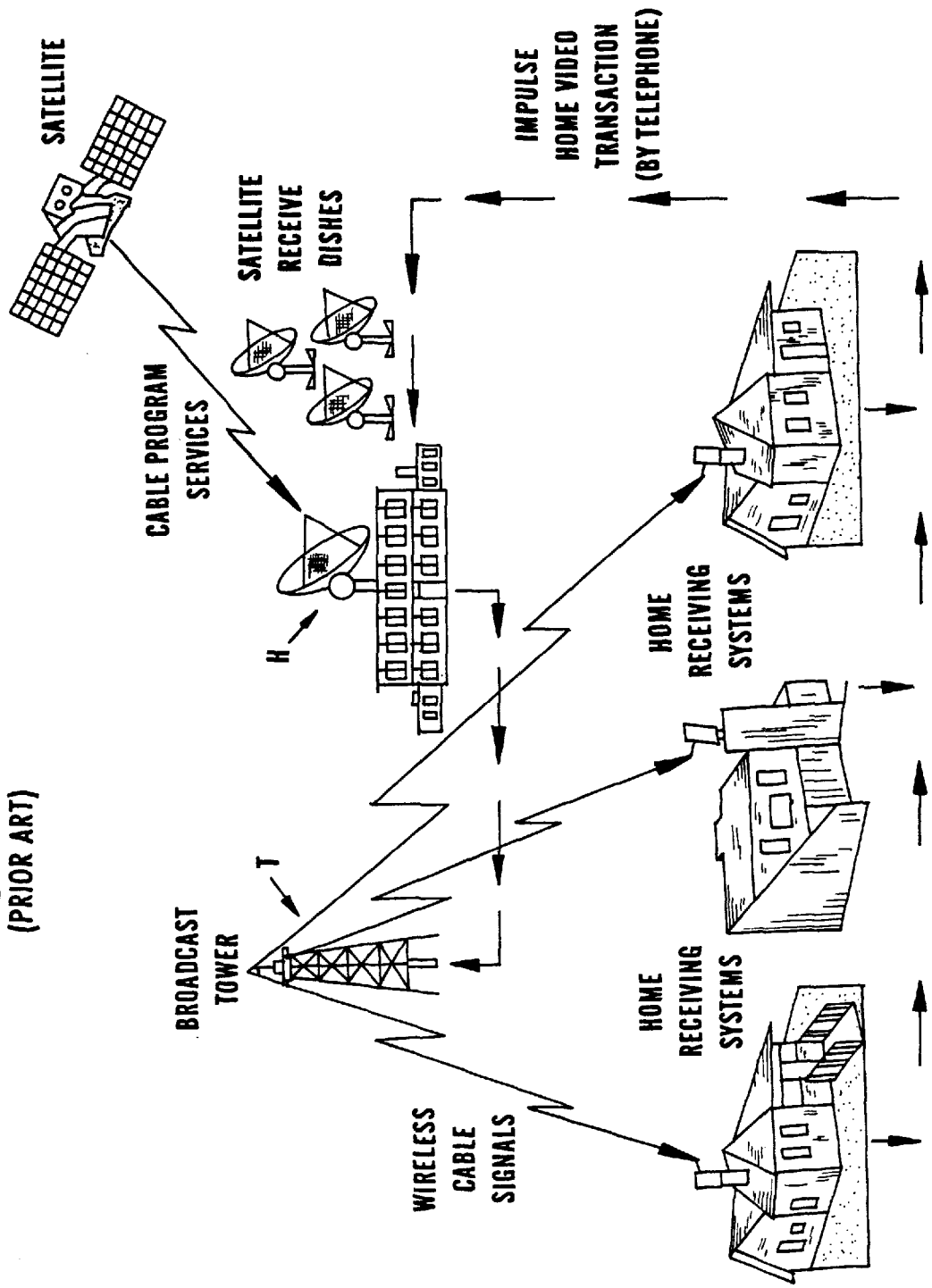
FIG. 1 is a simplified diagram of a prior art wireless cable television system.
Figure 1A:
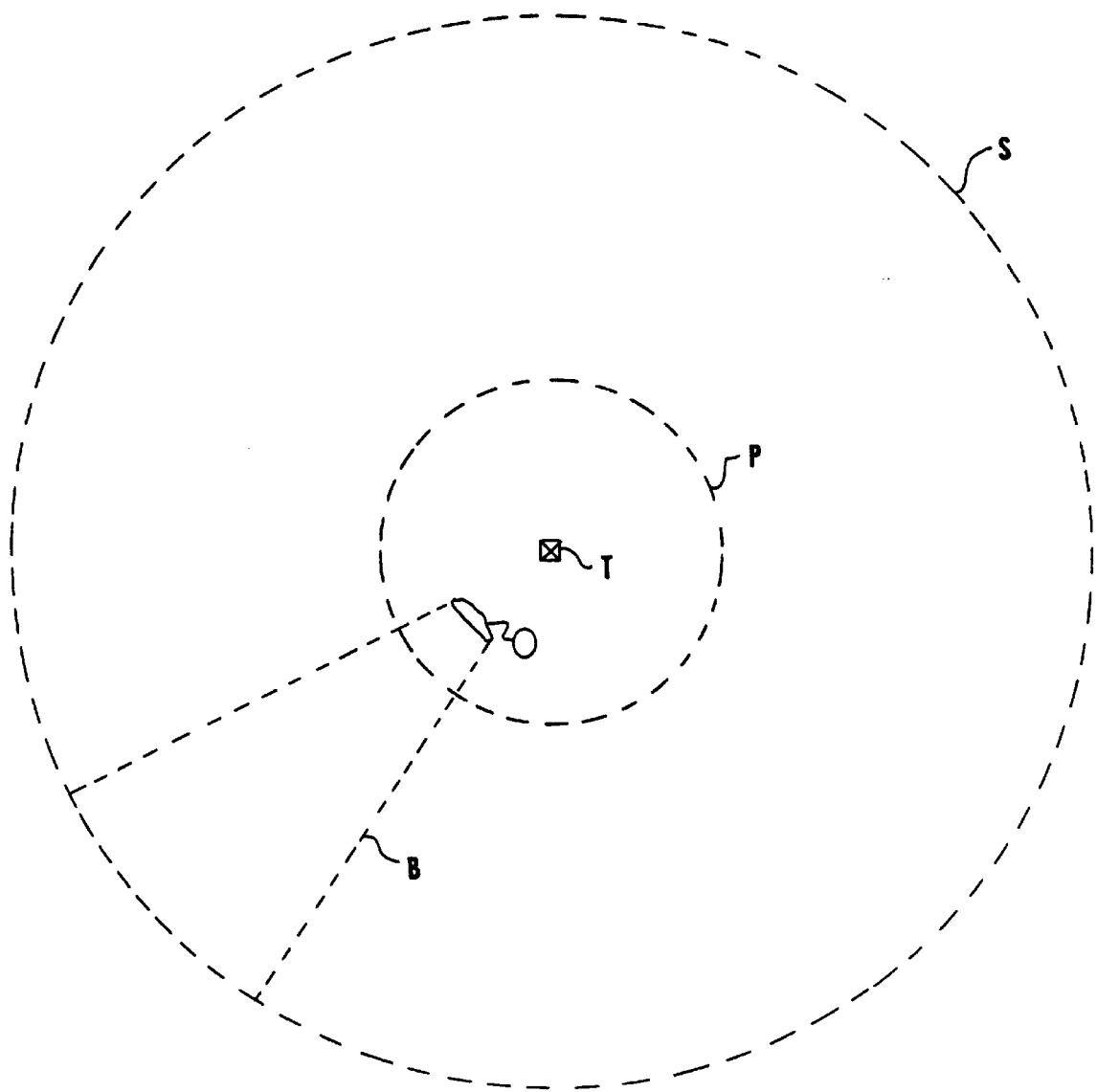
FIG. 1A shows service areas relating to a single wireless transmitter in the system of FIG. 1.
Figure 2:
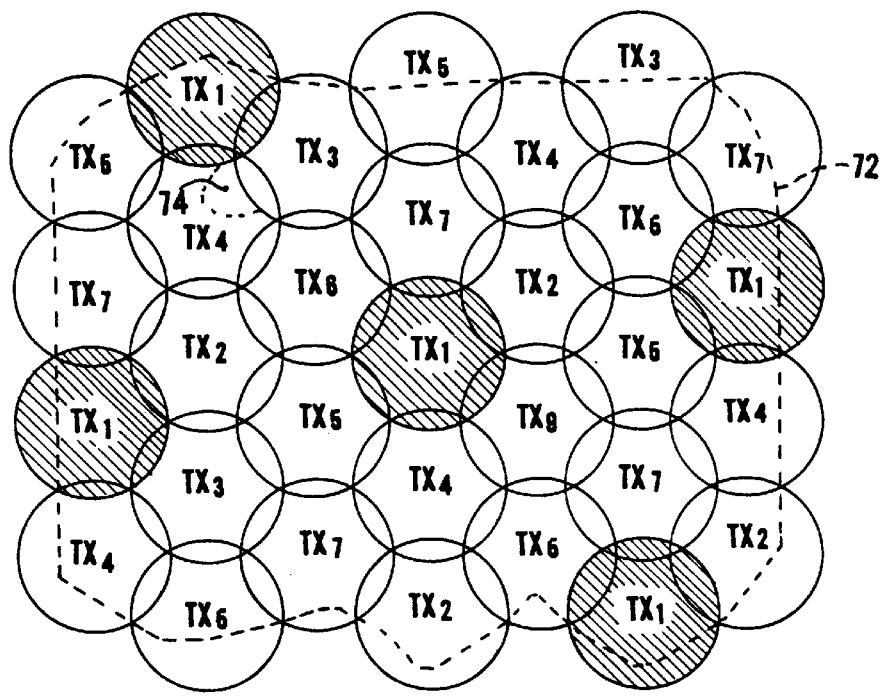
FIGS. 2 and 3 show propagation areas for multi-transmitter systems used in other types of prior art systems, e.g. paging.
Figure 3:
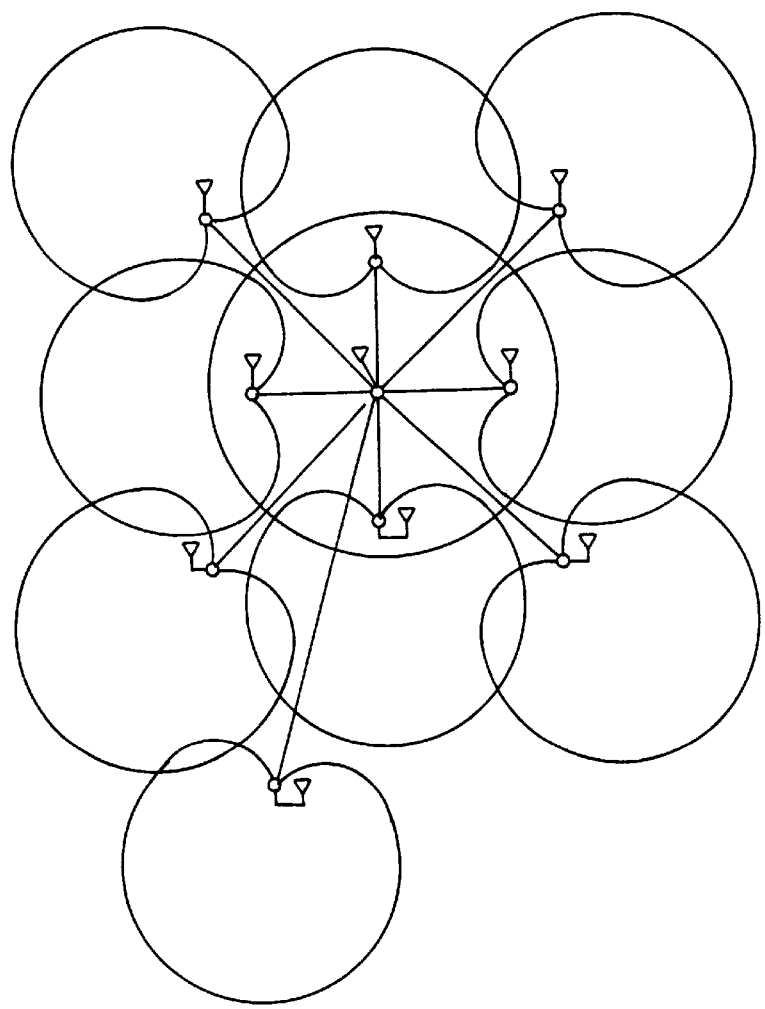
Figure 5A:
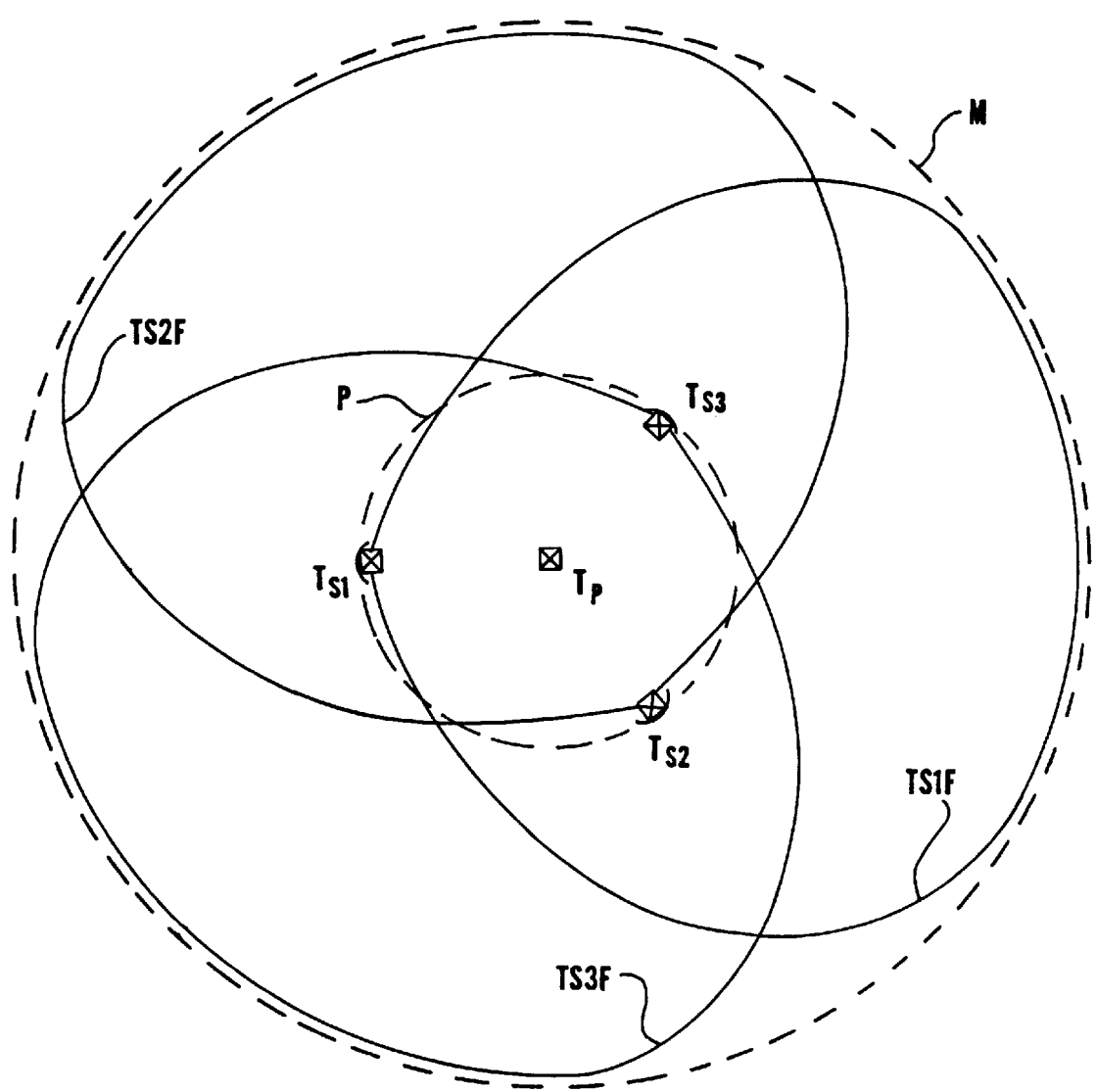
FIG. 5A depicts exemplary propagation patterns.

As shown in FIG. 5A, the central antenna $T_p$ broadcasts in an omni-directional propagation pattern. However, the secondary antenna $T_{S1}$, $T_{S2}$, and $T_{S3}$ are provided as directional antennas. The directional secondary antennae may radiate back lobes, albeit much smaller and lower in power than the cardioid shaped front lobes. Alternatively, reflectors may be provided so that these antennae substantially radiate only forward lobes as shown, TS1F for antenna $T_{S1}$, TS2F for the $T_{S2}$ antenna and TS3F for the $T_{S3}$ antenna. As shown, most locations within the primary service area P actually are within the radiation patterns of all four transmitting antennae. At most locations in the secondary area between boundary P and the maximum service area M, receivers are within the radiation patterns of the primary transmitter antenna $T_p$ and at least one and sometimes two of the secondary transmitter antennae. It will be seen that there is a radical departure from the minimum overlap approach which is conventional in the systems illustrated in FIGS. 2 and 3.

At most receiver locations in the area P, a directional antenna having approximately a 12 degree field of view can be aimed to receive transmissions from a single one of the transmitting antennae. For example, at location $X_{R1}$, a receiving antenna having a narrow field of view could be aimed at any of the four transmitting antennae which presents clear line of site reception. In particular, the receiving antenna can be aimed at the primary transmit antenna $T_p$ or at the secondary transmit antenna $T_{S1}$, whichever presents a stronger, unobstructed line of transmission to that location. Because of the directionality of the receiving antenna, the signal from the other non-selected transmitters will not interfere with the signal selected by the aiming of the directional antenna, e.g. if the antenna at location $X_{R1}$ is aimed at transmitter $T_{S1}$, the antenna will not receive any substantial transmissions from primary transmitter antenna $T_p$.

However, locations exist where two transmitters are aligned in the field of view of the directional receiving antenna, and the receiving antenna cannot be aimed to receive a line of sight transmission from only one transmitter. Assume for example, that a second receive location $X_{R2}$ is somewhere along line 1 to the right of the primary transmitter antenna $T_p$. A directional antenna at that location aimed at the primary transmitter antenna $T_p$ is also aligned to receive the simulcast transmission from secondary transmitting antenna $T_{S1}$.

In the simplest example, all of the secondary transmitter antennae $T_{S1}$, $T_{S2}$ and $T_{S3}$ are disposed along the boundary of the Protected Area P and therefore are substantially equidistant from the primary transmitter $T_p$. In the example complying with current MMDS rules, the primary area P has a radius of 15 miles (FIG. 4). In accord with the present invention, the secondary transmitters all transmit simultaneously (and preferably in phase with each other). Electromagnetic waves propagate through atmosphere at a rate of approximately 5.3 microseconds per mile. Consequently, the transmission from one of the secondary antennae aimed inward will arrive at the location of the primary antenna $T_p$ arrives arrive approximately 79.5 microseconds later. The primary antenna $T_p$ will broadcast the same signal at approximately the same time as each of the secondary antennae $T_{S1}$, $T_{S2}$ and $T_{S3}$. The signal from primary antenna $T_p$ therefore arrives at a location, such as $X_{R2}$, which is aligned with the primary antenna and one of the secondary antenna ($T_{S2}$ in the illustrated example) approximately 79.5 microseconds before the broadcast of the corresponding signals from the aligned secondary transmitter antennae (e.g. from $T_{S3}$) reaches that location.

Also, many systems in accord with the present invention will provide service in densely populated metropolitan areas. In such areas, high-rise buildings reflect signal transmissions in the relevant frequency range. Where there are two or more transmitters, the multiple transmitters create increased numbers of reflected signals off of the high-rise buildings. Even at locations receiving a single direct line of sight transmission, there will be a large number of multi-path reflection signals included in the signal output by the receiving antenna.

In accord with the present invention, a delay processor in the receiving terminal, such as an adaptive delay equalizer, processes signals from multipath reflections and in some cases from line of sight transmissions from multiple transmitter antennae to produce a single enhanced copy of the digital transport stream carried on a selected channel. The equalizer has a delay processing window which is at least as large as the longest delay offset between arrival times of signals from two aligned transmitter antennae. In the above example, the difference in arrival time is approximately 79.5 microseconds.

The delay processing window preferably is large enough to compensate for multipath interference from reflections of signals from the more distant transmitter. Typically, an equalizer should be able to process multipath signals having up to a 20 microsecond offset from a directly received source signal. Thus, in the present example, the adaptive delay equalizer has a processing window 20 microseconds longer than the delay of the last received direct transmission, i.e. 79.5+20 microseconds or approximately 100 microseconds.

It will be readily apparent that the length of the delay processing window of the equalizer will vary depending on the precise location of the broadcast transmitters. If the transmitters are nearer to each other, then the difference in arrival times is smaller, therefore the delay processing window will be smaller than that in the above example. Similarly, if the transmitters are farther apart from each other, then the difference in arrival times is larger, therefore the delay processing window will should be larger than that in the above example.

Figure 5B:
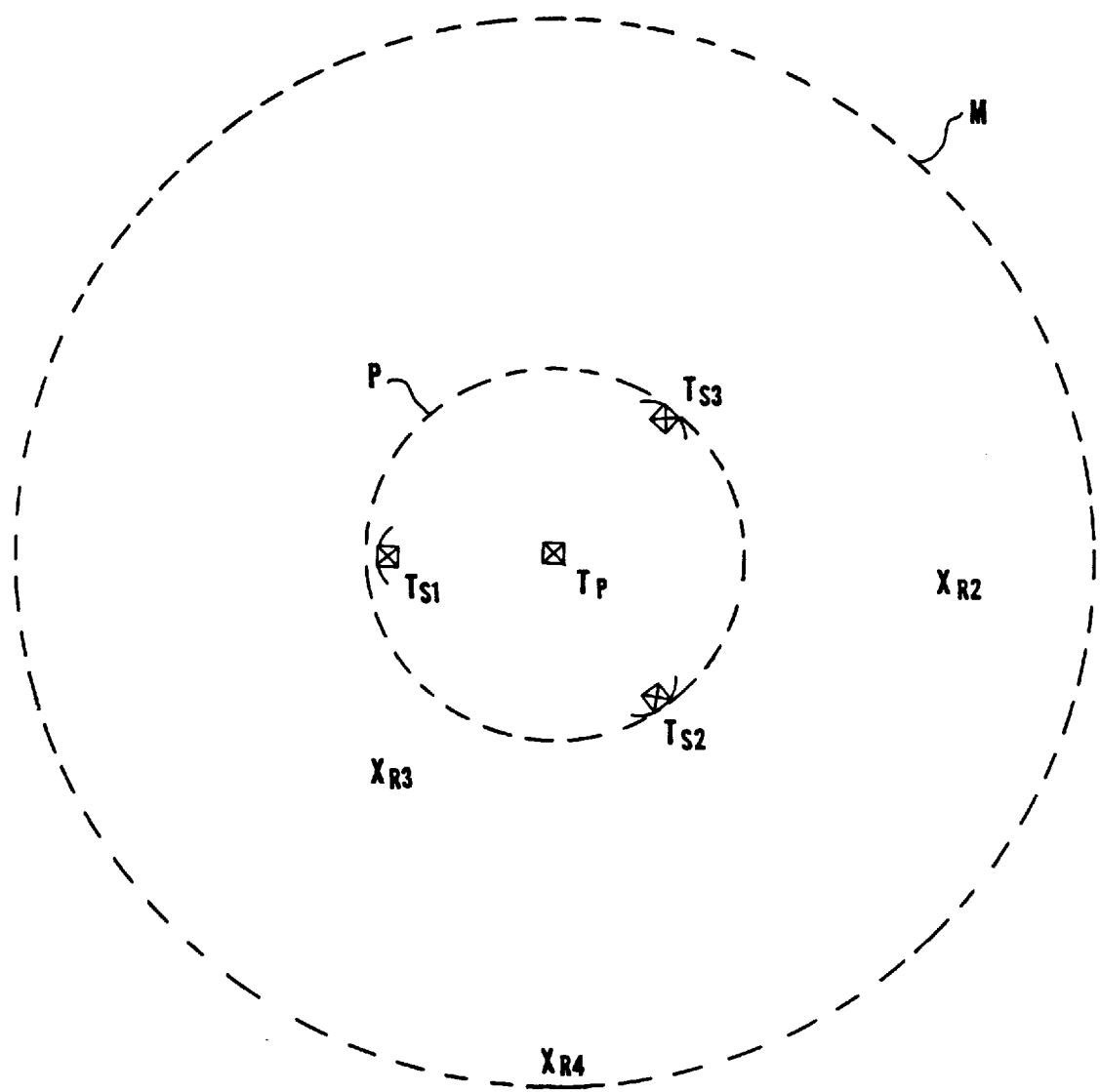
FIG. 5B depicts a more specific example of transmitter antennae locations, in accord with the present invention.

FIG. 5B presents a somewhat more complicated transmitter site layout. Again the central transmitter $T_p$ radiates an omni-directional pattern, and the secondary transmitters $T_{S1}$, $T_{S2}$ and $T_{S3}$ radiate directionally inward across the primary service area P and out into the secondary service area. In this example, however, the secondary transmitter antennae $T_{S1}$, $T_{S2}$ and $T_{S3}$ are not all equidistant from the primary transmitter antenna $T_p$. In many actual installations, the secondary transmitters will all be located at different distances from the primary transmitter antenna $T_p$. In other installations, two of the secondary transmitter antennae are equidistant but one or more of the other secondary transmitter antennae is at a different distance from the primary transmitter antenna $T_p$.

In the specific example illustrated, secondary transmitter antennae $T_{S2}$ and $T_{S3}$ are equidistant from the primary transmitter antenna $T_p$, i.e. 15 miles from the primary transmitter antenna $T_p$. The other secondary transmitter antenna, secondary transmitter antenna $T_{S1}$ is located 14 miles from the primary transmitter antenna $T_p$. All of the transmitters transmit the same signal at approximately the same time. In the preferred embodiment, the actual transmission are simultaneous and in-phase with each other. Signals from the secondary transmitter antennae $T_{S2}$ and $T_{S3}$ propagate to the location of the primary transmitter in approximately 79.5 microseconds and arrive at any aligned receivers approximately 79.5 microseconds after arrival of signals broadcast by the primary transmitter antenna $T_p$. Signals from the secondary transmitter antennae $T_{S1}$ propagate to the location of the primary transmitter in approximately 74.2 microseconds and arrive at any aligned receivers approximately 74.2 microseconds after arrival of signals broadcast by the primary transmitter antenna $T_p$.

Assume for discussion here use of a delay equalizer having a maximum interval or window for delay equalization of 100 microseconds. A delay equalizer having 100 microsecond delay processing window will be able to process multipath signals and multiple direct reception in an implementation such as shown in FIG. 5B. Consider now the reception of signals at various locations in line with two of the transmitting antennae.

Consider first the receiver location $X_{R2}$ shown on the right of FIG. 5B. Assume by way of example that location $X_{R2}$ is 30 miles from the site of primary antenna $T_p$. The receiving antenna receives broadcast transmissions from the primary antenna $T_p$ and the first secondary transmitter antenna $T_{S1}$. The location $X_{R2}$ is 44 miles from the site of the secondary transmitter antenna $T_{S1}$. Signals from the primary antenna $T_p$ reach location $X_{R2}$ after 159 microseconds (30×5.3), and signals from the first secondary transmitter antenna $T_{S1}$ reach location $X_{R2}$ after 233.2 microseconds (44×5.3). The difference in the arrival time is 74.2 microseconds, i.e. within the 100 microsecond delay processing window of the adaptive delay equalizer. The equalizer window will also process multipath signals arriving as much as 25.8 microseconds after the signal from the secondary transmitter antenna $T_{S1}$.

Consider now the receiver location $X_{R3}$ shown in the lower left portion of FIG. 5B. Assume by way of example that location $X_{R2}$ is 20 miles from the site of primary antenna $T_p$. The receiving antenna at that location receives broadcast transmissions from the primary antenna $T_p$ and the third secondary transmitter antenna $T_{S3}$. The location $X_{R3}$ is 35 miles from the site of the secondary transmitter antenna $T_{S3}$. Signals from the primary antenna $T_p$ reach location $X_{R2}$ after 106 microseconds (20×5.3), and signals from the third secondary transmitter antenna $T_{S3}$ reach location $X_{R3}$ after 185.5 microseconds (35×5.3). The difference in the arrival time is 79.5 microseconds, which again is within the 100 microsecond delay processing window of the adaptive delay equalizer. The equalizer window will also process multipath signals arriving as much as 20.5 microseconds after the signal from the third secondary transmitter antenna $T_{S3}$.

Consider now receiver location $X_{R4}$ in FIG. 5B, and assume that the secondary antennae radiate cardioid patterns substantially similar to those shown in FIG. 5A. As shown by comparing FIG. 5B to FIG. 5A, the location $X_{R4}$ approximately 40 miles due south of the primary transmitter $T_p$ is within the radiation area from the primary transmitter $T_p$ and the front lobe radiation area TS3F from the secondary transmitter $T_{S3}$. The directionality of the receiving antenna may not be sufficiently narrow to select one transmission and reject the other. However, as discussed below, the delay processing window of the adaptive delay equalizer (100 microseconds in the present example) is sufficient to process the signals from the two transmitters as well as 20 microseconds or more of multipath delay signals following arrival of the more distant signal transmission. The receiver at location $X_{R4}$ therefore can resolve the two transmission signals.

More specifically, assuming for simplicity that the secondary transmitters all are separated by 120 degrees (the transmitter $T_{S3}$ is 60 degrees above the horizontal in FIG. 5B), the distance between the receiver location $X_{R4}$ and the secondary transmitter $T_{S3}$ can be geometrically calculated as approximately 53.5 miles. Signals propagate from the secondary transmitter $T_{S3}$ to the receiver location $X_{R4}$ in 283.55 microseconds (53.5×5.3). At forty miles from the primary transmitter $T_p$, signals from that transmitter require 212 microseconds to propagate to the receiver location $X_{R4}$. The difference in the arrival time is 71.5 microseconds, which again is within the 100 microsecond delay processing window of the adaptive delay equalizer. The equalizer window will also process multipath signals arriving as much as 28.5 microseconds after the signal from the third secondary transmitter antenna $T_{S3}$.

Details of a specific implementation of a broadcast system and a receiver terminal in accord with the present invention are set forth below.

The simulcast transmission from the broadcast antennae include a plurality of frequency multiplexed channels. Each channel contains a digital transport stream carrying a number of programs, in compressed digital form. The programs may be audio only programs, or data, but in the preferred embodiments, the programs are television type programs. The television type programs contain video and audio information, and may include data information, e.g. for closed captioning and the like. The system and method for transmitting the simulcast signals and receiving those signals within the service area are now briefly described.

Figure 6:
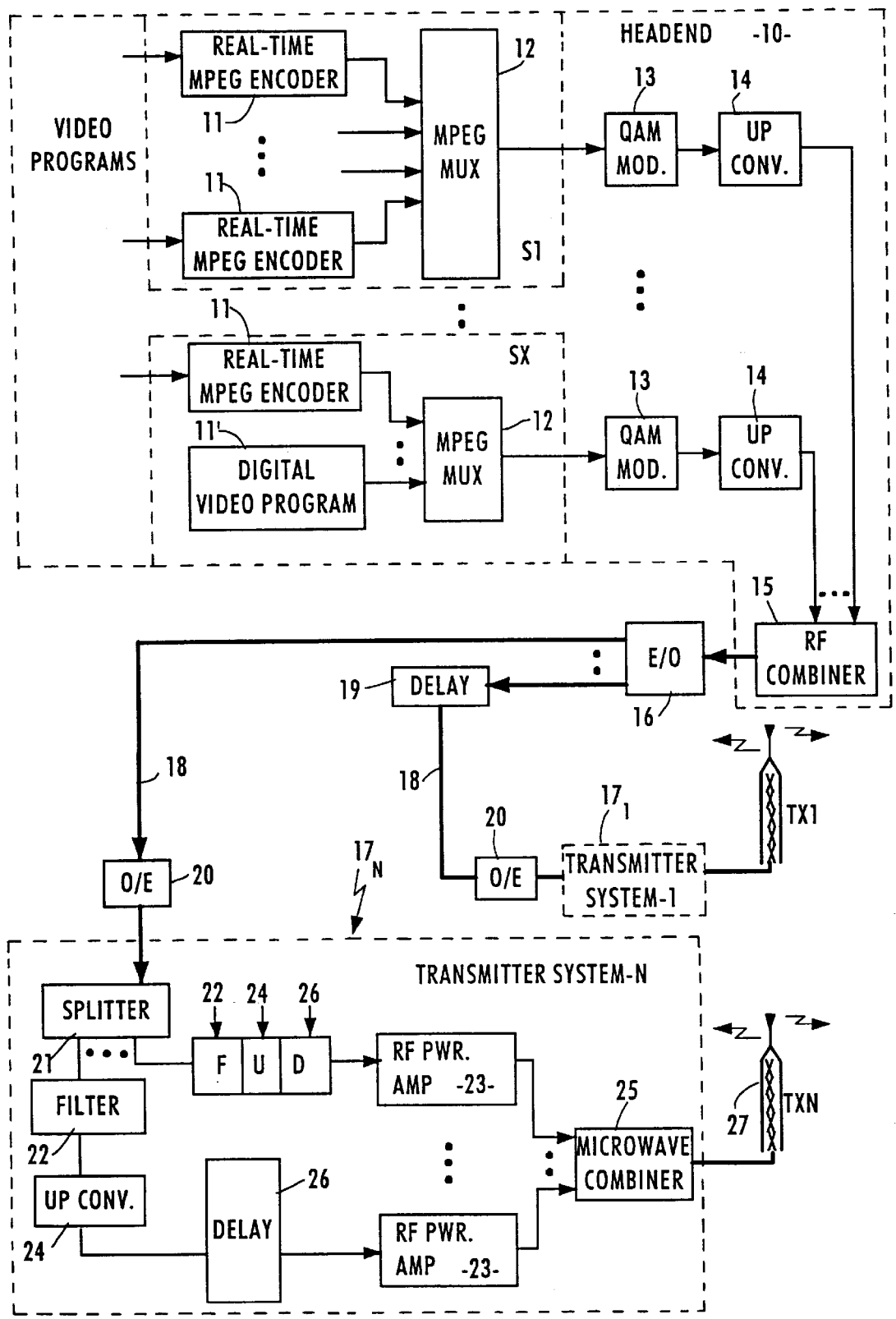
FIG. 6 depicts in functional block diagram form the elements of the transmission system used in accord with the present invention.

With reference to FIG. 6, the broadcasting portion of the system includes a headend 10. The headend includes a number of Sources S1 to SN for producing digital transport streams, each of which contains a plurality of programs encoded as digital, compressed data. The number of such sources corresponds to the number of frequency channels available for use in a particular geographic region. Typically, the FCC licenses up to 33 channels of MMDS and ITFS services in a given area. It may be possible to aggregate rights to use all such channels, but to provide a commercially viable service, typically only 20–25 such channels are necessary. The headend 10 therefore typically comprises 20–25 of the Sources S1 to SN, but may include as many as 33 such sources. The Sources S1 to SN may convert analog program information from video sources, (e.g. off-the-air feeds, satellite receivers, VCRs, etc.) into compressed, digital data form. The headend 10 may also receive and process previously encoded material.

The video information, accompanying audio information and certain related data (if any) are encoded using a standardized digitization and compression technique, such as MPEG (moving pictures expert group) or DIGICIPHER™. The preferred embodiment utilizes MPEG II encoding. FIG. 6 illustrates the overall architecture of the broadcasting system. As part of the headend 10, that figure provides a simplified diagram of the source encoder functionality, e.g. at S1, for preparing a group of original analog source signals for transport through the network. As shown, each analog television signal, e.g. in NTSC format, is applied to an MPEG encoder 11. The encoder 11 digitizes both audio and video for a program, and packetizes the compressed digital data in accord with the appropriate standard. The encoder may also encrypt the data before insertion thereof into the transport packets.

MPEG is a bi-directional predictive coding compression system, utilizing discrete cosine transformation (DCT) processing. Picture elements are converted from spacial information into frequency domain information. Compression begins by discarding information to which eyes are insensitive. From the remaining information, the encoder will develop reference (I) frames, predictive (P) frames and delta (B) frames.

The number of frames to be coded for each I frame is set in the standardized MPEG syntax, e.g. one reference frame for each group of fifteen frames, or every half second. A prediction is made of the composition of a video frame, termed a P frame, to be located a specific number of frames forward and before the next reference frame, this specific number also is set in the MPEG syntax. Information from previous video frames as well as later video frames is used in formulating the prediction. "Delta" or "B frame information is developed for coding the video frames between the actual and predicted frames, also by looking at frames in both directions. Rather than updating a whole frame, only the changed (or delta) information is provided for the delta video frames. Thus the total information coded, and then transmitted, is considerably less than that required to supply the actual information in the total number of frames. Typically, between I frames, the frame sequence consists of a repetitive succession of two B frames followed by one P frame.

The MPEG II standard provides a standardized format for packetizing the compressed audio and video information and for transporting other data. Under the MPEG II standard, incoming individual video signals and related audio signals are encoded and packetized into respective Video and Audio Packetized Elementary Streams (PES). The video and audio PES's from one or more sources of video programming may be combined into a transport stream for transmission or storage.

Each frame of compressed program information (audio, video or data) is broken down into a series of transport packets. Although the frames can vary in length, e.g. between a full reference I-frame and a delta B-frame, the transport packets have a fixed 188 byte size. Thus, different frames are broken down into different numbers of MPEG transport packets. For example, in a 6 Mbits/s encoding system, a group of frames consisting of a total of 15 frames for one-half second of video (one I frame and a number of P and B frames), breaks down into 2000 transport packets (or 4000 transport packets per second).

Each 188 byte transport stream packet consists of two sections, a 4 byte packet header section, an optional adaptation field and a payload section. The header information includes, inter alia, a synchronization byte, a variety of different flags used in reconstruction of the frames, and a thirteen bit program identification (PID) number. PID value 0 is reserved as an indication that the packet includes program association table data. PID value 1 is reserved for identification of packets containing conditional access data, such as encryption information. Other program identification numbers are utilized to identify transport packets with the program or source from which they originate.

Periodically, the transport packet for each program will also include a program reference clock (PRC) value within the optional adaptation field. In a typical 6 Mbits/s MPEG encoding system, the PRC is present in approximately 10 out of every 4000 video transport packets.

When included, the optional adaptation field includes a section for miscellaneous flags, such as discontinuity counter, private data flag, etc. One of the possible flags carried in this portion of the adaptation field is a program clock reference (PRC) flag. The adaptation field (AF) also includes a section designated for AF options. One of the options this section may carry is the PRC value.

On decompression, the decoder in sequence reconstructs the frames for a particular program from packets bearing the appropriate PID value, uses the reference frame to form the prediction frames, and then uses the prediction frames and delta information to construct full frames from the delta frames.

The MPEG II standard facilitates time division multiplexing of MPEG packets from a plurality of programs. In the present system, the encoders 11 supply MPEG packets streams for multiple programs to an MPEG multiplexer 12. The number of programs may vary depending on the bandwidth. The MPEG multiplexer 12 may receive digitized and compressed (MPEG) video from other sources 11'. Typical digital sources 11' include digital server (storage) systems and digital video transmission systems (e.g. satellite or optical fiber).

As discussed below, a typical multiplexed digital transport packet stream used in the present invention has 27 Mbits/s of capacity. A mixture of program streams for individual programs at different individual rates, e.g. 1.5 Mbits/s, 3 Mbits/s and 6 Mbits/s, are combined to fully utilize the 27 Mbits/s capacity. In one example, the 27 Mbits/s multiplexed digital transport packet stream might consist of three 3 Mbits/s programs and three 6 Mbits/s programs. For simplicity of further discussion, however, assume encoding of programs at a 6 Mbits/s rate, therefore the multiplexer 12 combines four MPEG II packet streams of four such programs for output on each broadband rail.

The simplified example therefore provides four programs for one RF channel, i.e. a 4 to 1 improvement over the existing single analog program channel. The other mix of three 6 Mbits/s programs and three 3 Mbits/s programs provides six programs for one RF channel, i.e. a 6 to 1 improvement. Lower bit rates and/or more efficient modulation techniques can further extend the program capacity provided through each RF channel.

In a typical example, there are at least three PID values for packets of a particular television type program encoded in MPEG II form, a first PID value for packets containing video, a second PID value for packets containing audio and another PID value for a packet containing a program map. There often are more than three PID's associated with the packets containing programming from one source. For example, there could be a data channel associated with the program which would include data for closed captioning for the hearing impaired and/or related control signaling information. There could be a number of audio elementary streams, for example, carrying respective different languages. The program map, in turn, specifies the PID values for the various packets containing video, audio and/or data from the particular source.

In a combined MPEG packet stream carrying packets for two or more programs, the PID values for each program will be unique, and each such program is assigned a unique program number (PN). For example, HBO might have a program number '1', and the program map for HBO might be found in packets corresponding to PID 132. Showtime might have a program number of '2', and the program map for Showtime might be found in packets identified by PID 87 and so forth. The program map for HBO in the packet with PID 132 would then identify the PID numbers for the actual packetized elementary streams (PES) for the video, audio and data (if any) channels associated with the HBO program. The program map for Showtime in the packet with PID 87 would then identify the PID numbers for the actual packetized elementary streams (PES) for the video, audio and data (if any) channels associated with the Showtime program.

In the present embodiment, each multiplexer 12 outputs a group of MPEG encoded programs, i.e. four if the encoding rate of all encoders 11 is 6 Mbits/s, at a combined payload rate of 27 Mbits/s (it may be necessary to pad the steam with dummy packets to reach the full 27 Mbits/s). The MPEG II standard also requires that a packet stream containing packets relating to one or more programs includes a program association table in a packet identified by PID 0. The program association table maps each program number with the PID value associated with the program map related to that source. In accord with the standard, each MPEG II multiplexer 12 combines MPEG packet streams for the four (or more) input programs and adds a PID 0 packet containing the program association table to the combined stream. In the above example, the program association table would map program number '1' (HBO) with PID value 132 indicating that the program map for HBO is contained in repeating packets identified by PID 132. Similarly, the program association table would map program number 's' (Showtime) with PID value 87 indicating that the program map for Showtime is contained in repeating packets identified by PID 87.

As discussed in more detail below, reception of a particular digital program requires that the CPE terminal device know the RF channel transporting the program and the program number (PN) associated with the program. The decoder uses the information contained in the PID 0 packet to identify the PID value for the program map for the particular desired program, e.g. 132 in the above HBO example, and uses the program map to identify the PID values needed to capture the video, audio and user data (if any) for the desired program.

The 27 Mbits/s baseband digital output of each MPEG multiplexer 12 from one of the sources S1 to SN goes to a modulator 13. U.S. Pat. No. 5,231,494 to Wachob, the disclosure of which is incorporated herein in its entirety by reference, teaches quadrature phase shift keyed (QPSK) modulation of a plurality of video, audio and data signals into a single data stream within a standard six Mhz channel allocation for transmission over a cable television type distribution network. The currently preferred implementation uses 64 QAM (quadrature amplitude modulation) or 16 VSB (vestigial sideband) modulation techniques in the modulators 13. Using 64 QAM, 4 channels of 6 Mbits/s or a mix of 1.5, 3 and 6 Mbits/s encoded digital video information up to a total of 27 Mbits/s can be modulated into one 6 Mhz bandwidth analog channel. Similarly, 256 QAM or 16 VSB would yield up to 40 Mbits/s of capacity, e.g. for 6 channels of 6 Mbits/s or mixes of the various rate encoded digital video information modulated into one 6 Mhz bandwidth analog channel. Each modulator 13 produces a 6 Mhz bandwidth output at an intermediate carrier frequency.

Each modulator 13 outputs the intermediate frequency signal to an individual upconverter 14. The upconverter converts the frequency of the QAM modulated signal up to one of up to thirty-three RF channel frequencies in the 50–450 MHz range. The upconverter 14 may be an element of the QAM modulator 13 or a separate element as shown hard wired to process the output of the QAM modulator. Each upconverter 14 outputs a different 6 MHz bandwidth RF channel to an RF combiner 15 for combining with the other 6 MHz RF signals from the other upconverters 14. The RF combiner 15 thereafter outputs the combined RF signals in the normal video channel range of approximately 50–450 Mhz. The upconverters 14 and the RF combiner 15 may be the same as components currently used for RF signal processing in cable television systems.

A transmission network supplies the combined spectrum signal in the UHF range from the combiner 15 to a number of transmitter systems $17_1$ to $17_n$. The transmitter systems $17_1$ to $17_n$ correspond to the transmitters TX1 to TX4 described above with respect to FIGS. 4 and 5. Although coaxial cable, wireless microwave relay transmissions or other media could be used, in the preferred embodiment, the transmissions from the headend 10 ride on optical fiber lines 18. In the preferred embodiment, an electrical to optical converter system 16 converts the signal from combiner 15 into optical signals for transmission over a plurality of optical fibers 18. An optical to electrical unit 20 at each transmitter site converts the optical signal back to the combined electrical signal and supplies that signal to one of the transmitter systems.

An important feature of the present invention relates to simulcasting, i.e. simultaneous broadcasting, of the combined spectrum UHF signal from all of the transmitter towers TX1 to TXN. The optical fiber signal transmission from the headend 10 to the transmitter systems requires some finite amount of time. Typically, the transmitter systems will not be equi-distant from the headend. In fact, one of the transmitter systems may be in the same building as the headend. To insure simultaneous broadcasting, the system shown in FIG. 6 therefore includes some form of delay 19 in one or more of the transport lines 18. The delay may take the form of coils of fiber to equalize the optical transport paths and therefore the time through each path. Alternatively, one or more electronic delay devices may be imposed in the relevant paths, either at the headend prior to optical transport or at the respective transmitter location subsequent to conversion back to electrical signal form.

There may be as few as two transmitters. In a typical example, there will be a central transmitter site TX1 and two or three other transmitter sites TX2, TX3 and TX4 at various locations about the primary reception area (see e.g. FIGS. 4 and 5). The headend may be close to the central transmitter site TX1, therefore the transport distance to that site would be the shortest. Assume now, for example, that TX4 is the longest distance from the headend. The delay produced by delay device 19 will be equal to the difference in the time required to transport optical signals from the headend to those two sites, i.e. so as to result in simultaneous in-phase transmission of the exact same signal from the antennae at the two transmitters TX1 and TX4. Similar delays are imposed in the lines 18 to the other transmitter systems.

FIG. 6 also shows details of one of the transmitter systems 17N, by way of an example. Each transmitter system includes a splitter 21. The splitter 21 together with associated channel selection filters 22 divide the received combined signal (50–450 MHz) into its constituent 6 MHz wide RF channels. For each 6 MHz channel in the 50–450 MHz range, one of the upconverters 24 converts that channel into one of the up to thirty-three available (licensed) channels in the UHF microwave range. An RF power amplifier 23 amplifies each UHF channel.

A delay device may process each channel signal, and by way of example, FIG. 6 shows a delay device 26 processing the output of each of the upconverters 24. The delay devices 26 provide precise delay compensation on each respective channel to compensate between variations in throughput processing time of the various components at different transmitter sites operating on the signal to be broadcast on a particular microwave channel.

A microwave combiner 25 combines the UHF channel signals back into a combined spectrum signal in the UHF range and supplies that signal to a microwave broadcasting antenna 27. Each transmitting antenna may be an omnidirectional antenna or a directional antenna. The type of antenna at each transmitter site is selected to give the optimum coverage in a particular geographic service area. The antenna 27 emits UHF waves to propagate through a portion of the service area. For each channel, the resultant broadcasts from all of the transmitters are synchronized and in phase with each other. The transmitted microwave signals propagate into substantially overlapping portions of the service area and into some non-overlapping portions of that area, for example in patterns such as shown in FIGS. 4 and 5.

The above discussion of the headend and transmission systems is one example of an overall system for providing the simultaneous, synchronized, in-phase broadcasts from multiple transmitters having substantially overlapping propagation areas. Other headend and transmitter systems could be used. For example, the headend 10 could perform the digital multiplexing, and the transport network to the transmitters TX1 to TXN could carry the multiplexed transport streams in digital form. In such a case, the individual transmitter systems would further include at least the QAM modulators for each RF channel. In such a system, the transmitters may include means to synchronize processing and broadcast transmissions to some common clock, e.g. from a geo-positioning type satellite system, to achieve the simulcast transmission.

Figure 7:
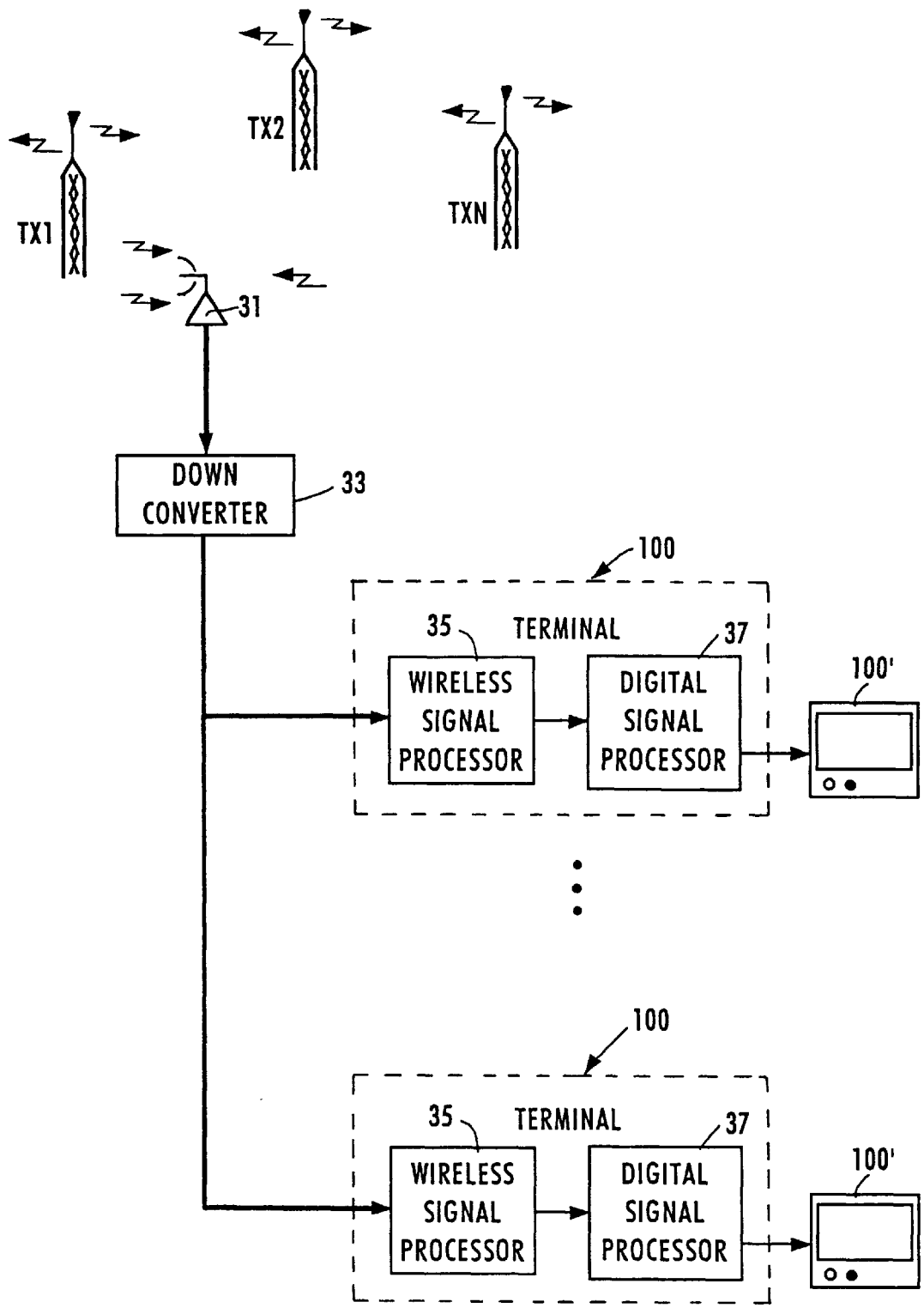
FIG. 7 illustrates the functional elements of a customer premises receiver system used in accord with the present invention.

FIG. 7 provides a high-level functional diagram of a receiving system at one subscriber's premises. Each subscriber has a receiving antenna 31. In accord with the preferred embodiment, the receiving antenna 31 is a directional antenna. At most potential receiving sites, it will be possible to aim the antenna 31 toward at least one of the transmitters and receive line-of-sight transmissions therefrom. Transmissions from one transmitter, e.g. TX2, may be blocked by an obstruction (not shown), but line-of-sight transmissions from at least one of the other transmitters, such as TX1, is more likely to be unobstructed.

At installation, the directional antenna 31 is aimed at the one transmitter TX1 to TXN which produces the strongest received signal through the antenna at the subscriber's particular location. Even so, the antenna receives multiple copies or replicas of the transmitted waveform signals. These multiple copies include a primary direct line-of-sight transmission of a signal from the transmitter the antenna is directed towards together with delayed copies (typically attenuated and distorted) caused by reflections of the transmissions from one or more of the multiple broadcast sites. Also, at locations in the secondary reception area, the direction of reception by the antenna 31 may actually be substantially in line with two of the transmitters, as discussed above relative to FIGS. 4, 5A and 5B. In such a case, the antenna would receive a first copy of the combined spectrum transmission from the closest transmitter followed by a delayed copy transmitted from the more distant of the two aligned transmitters.

The present invention therefore contemplates inclusion of a delay processor in the receiver to compensate for the reception of multiple delayed copies of the transmitted program signals. One implementation of the delay processor utilizes a delay equalizer. An alternative implementation of the delay processor utilizes spread spectrum technology, as discussed in more detail in below in reference to FIG. 9B and as disclosed in commonly assigned U.S. patent application Ser. No. 08/405,685, filed Mar. 17, 1995 (attorney docket no. 680-117) entitled "Television Distribution System and Method," the disclosure of which is incorporated in its entirety herein by reference.

The receiving antenna 31 supplies the 2.6 GHz spectrum (through appropriate filtering not shown) to a block down-converter 33. The block down-converter converts the 2.6 GHZ signal, containing all of the RF channels, back down to the video channel band of 50–450 MHz. The block down-converter supplies the 50–450 MHz combined spectrum signal via a coaxial cable to one or more terminal devices 100 located at various places in the subscriber's home. Each terminal 100 includes some form of wireless signal processor 35 for processing a selected one of the 6 MHz channels to recover the digitally multiplexed transport stream carried in that channel. Each terminal connects to an associated television set 100'. The digital signal processor 37 processes data packets for the selected program from the multiplexed stream to produce signals to drive the TV 100'. The TV '100' presents the program to the viewer in sensorially perceptible form, in this case, as a standard audio/visual output.

Figure 8:
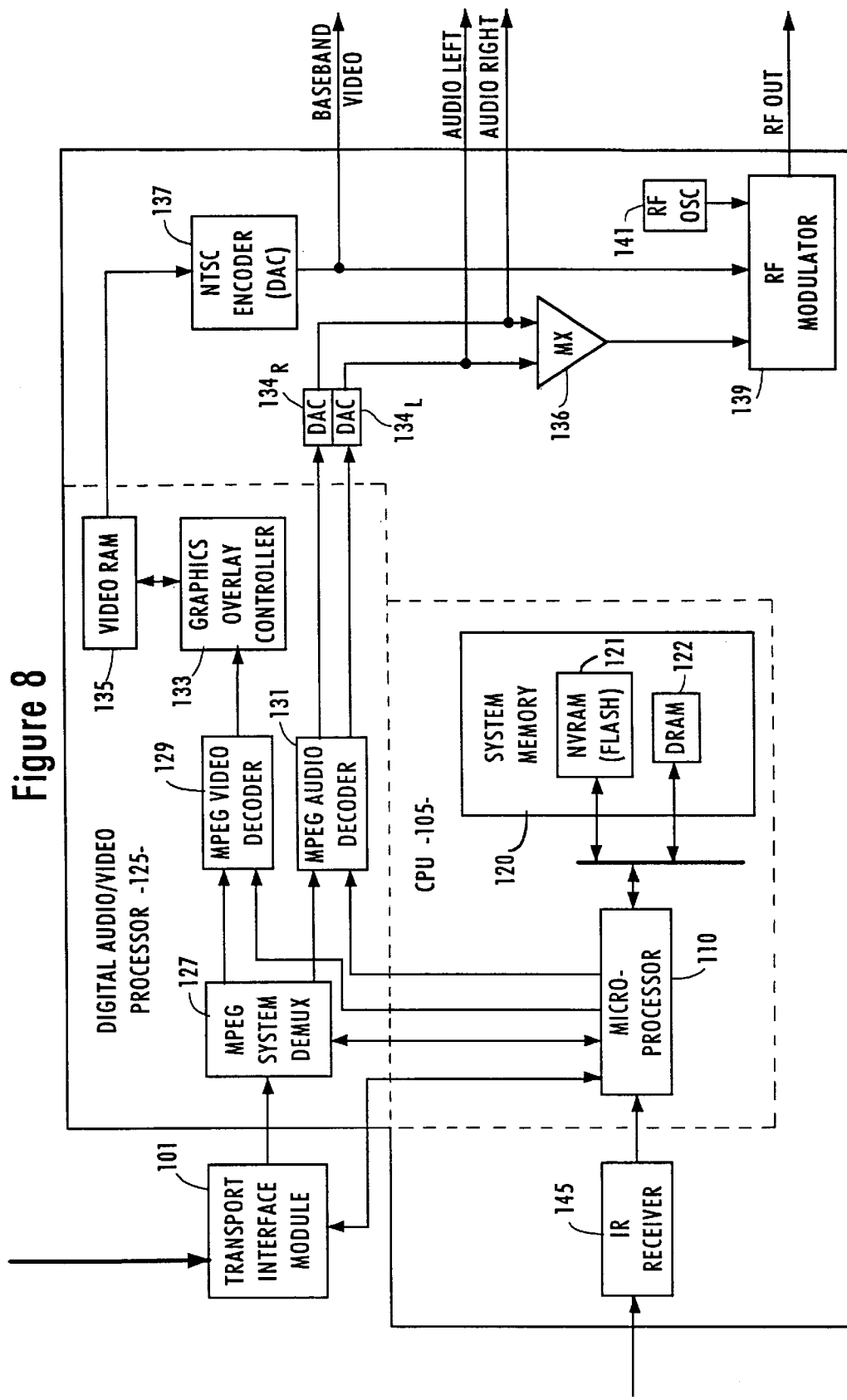
FIG. 8 illustrates in block diagram form the elements of one terminal device used in the system of FIG. 7.

FIG. 8 illustrates the functional elements of the terminal 100. In this embodiment the terminal 100 is a digital entertainment terminal, or 'DET.' The DET 100 will include a transport interface module (TIM) 101 providing the actual physical connection to the coaxial cable network in the subscriber's premises. The transport interface module (TIM) 101 will also perform the format conversion necessary between signal formats utilized by the network and signal formats used within the digital processing portion of the DET 100. In the present invention, the TIM performs RF tuning and QAM demodulation. If the programming is encrypted, the TIM also includes the necessary decryption circuitry. The TIM 101 therefore serves as the wireless signal processor 35. The main portion of the DET 100 serves as the digital signal processor 37.

In the illustrated embodiment, the transport interface module (TIM) 101 presents two connections to the rest of the DET, a high bit rate broadband connection for received broadband signals and a low bit rate signaling connection to permit control and monitoring of the TIM by a microprocessor within the main portion of the DET. For a selected channel, the TIM hands off the 27 Mbits/s baseband digital transport stream captured from that RF channel to the main portion of the DET. The structure of the TIM 101 is described in more detail below with regard to FIGS. 9A and 9B.

The DET 100 includes a CPU 105, comprising a 386, 486 or Pentium microprocessor 110 and associated system memory 120. The system memory 120 includes at least 2 mbytes of volatile dynamic RAM 122 and 1 mbyte of non-volatile RAM 121. The microprocessor 110 includes a small amount of ROM (not shown) storing "loader" programming needed to control wake-up. An EPROM memory (not shown) also may be added.

A digital audio/video signal processor 125, controlled by the CPU 105, produces digital uncompressed audio and video signals from the audio and video MPEG encoded packets received from the network through the interface module 101. The audio/video processor 125 includes an MPEG system demultiplexer 127, an MPEG video decoder 129, an MPEG audio decoder 131, a graphics overlay controller 133 and at least two frames (e.g. 8 mbytes) of video RAM 135.

The MPEG system demultiplexer circuitry 127 recognizes packets in the MPEG data stream received over the broadband channel through the transport interface module (TIM) 101 and routes the packets having predetermined PID values to the appropriate components of the DET. For example, under CPU control, the MPEG system demultiplexer 127 circuitry recognizes audio and video packets in the MPEG data stream as audio and video relating to a selected program and routes those packets to the decoders 129, 131, respectively. The MPEG system demultiplexer circuitry 127 route packets having specified PID values identified as user data packets to the CPU 105 for further processing. The MPEG system demultiplexer circuitry 127 recognizes program map packets (and program association packets if necessary) and supplies those packets to the CPU 105.

The MPEG video decoder 129 decompresses received video packet signals to produce a digital video signal, and the MPEG audio decoder 131 decompresses received audio packets to produce left and right digitized stereo signals. For at least some functions, the MPEG decoders 129, 131 may be controlled in response to signals from the microprocessor 110. The MPEG video decoder 129 will internally include at least two frames (e.g. 8 mbytes) of RAM (not separately shown) for use as a frame reorder buffer during the MPEG video decoding process, and the MPEG audio decoder 131 also may include some buffer memory.

The video RAM 135 is not a specialized "video RAM" as that term is sometimes used in the television art. The RAM 135 is actually a standard digital data RAM, of appropriate size, which is used in the DET to store digitized frames of video data. The RAM within the MPEG video decoder 129 likewise consists of standard digital data RAM.

The graphics display generator produces displays of text and graphics data, such as the initial turn-on selection menu received over the signaling channel, in response to instructions from the CPU 105. The video RAM 135 sequentially receives each frame of digitized, uncompressed video information, as output from the MPEG video decoder 129. The video RAM 135 also receives digital information and read/write control signals from the graphics overlay controller 133 representing the several planes of text and graphics information and combines that information with the frames of decompressed video to produce composite video frames.

The graphics overlay controller 133 and the video RAM 135 actually cooperate to manipulate five different planes of video information, four of which can be active at any one time, to produce the composite video fame output signals. The individual planes comprise the decoded MPEG video frames, a cursor, two graphics/text image planes manipulated by the microprocessor 110 and a backdrop plane. The backdrop plane would be switched in to replace the plane representing the decoded MPEG video frames, e.g. to present a blue background instead of the MPEG video background.

When there are no graphics or text, the composite frames would correspond entirely to the uncompressed received video frames output by the MPEG video decoder 129. When no received video frames are to be output, either when none are received or when they are to be entirely replaced, the information from the graphics overlay generator 133 would specify a background and the active planes of text or graphic information. When received video frames are combined with text and/or graphics, the composite video frames include the uncompressed received video frames with selected pixels thereof replaced with graphics or textual data display pixels specified by the graphics overlay controller 133. In this last situation, the graphics overlay controller would deactivate the backdrop plane.

The DET also includes audio and video digital to analog converters and appropriate drivers to produce output signals compatible with a conventional television set. Specifically, the converter and driver circuitry of the DET 100 includes audio digital to analog converters (DAC's) $135_L$, $135_R$, an audio mixer 136, an NTSC encoder 137, and an RF modulator 139.

The DAC's $135_L$ and $135_R$ receive the uncompressed left and right digitized audio signals output by the MPEG audio decoder 131. In response, the DAC's $135_L$ and $135_R$ produce baseband analog audio signals for output to individual baseband output terminals. The audio mixer 136 also receives the baseband audio signals from the DAC's $135_L$ and $135_R$. The mixer 136 combines the left and right analog audio signals to produce a monaural audio signal as the audio input to modulator 139.

The NTSC encoder 137 also performs a digital to analog converter (DAC) function. In response to the digitized video output signals from the video RAM 135, the NTSC encoder 137 produces a baseband analog video signal in standard NTSC format. The baseband NTSC video signal is supplied to an output terminal of the DET 100. The baseband NTSC video signal is also supplied to the RF modulator 139. The RF modulator 139 responds to the mono audio signal, the NTSC video signal and an RF signal from a local RF oscillator 141, to produce a standard RF television signal on an available TV channel, typically channel 3 or channel 4.

The type of connection of the DET 100 to the television set depends on the capabilities of the user's television set. If the user has a monitor type television capable of receiving baseband video and stereo audio inputs, the appropriate terminals of the television would connect directly to the video and audio output terminals of the DET 100. If the subscriber does not have such a television monitor, then the RF output of the modulator 139 would be connected to the cable or antenna input connection of the television, e.g. by coaxial cable. Alternatively, the digitized video and audio may go to separate output terminals (not shown) for connection to inputs of digital display devices, for example, for high definition television (HDTV) sets.

Each DET also includes means to receive selection signals from a user. In the embodiment illustrated in FIG. 8, the DET 100 includes an infrared (IR) receiver 145. The (IR) receiver 145 responds to inputs signals from a user operated IR remote control device (not shown) similar to that used today for controlling televisions and video cassette recorders. In response to the IR signals, the receiver 145 produces corresponding digital data output signals. The microprocessor 110 interprets the digital data signals by the IR receiver 145 as input commands. The precise interpretation of specific command signals can vary based on applications programming and/or operating system software stored in the system memory 120. For example, in response to certain input commands, the microprocessor 110 may control a cursor position and display received user data in the form of alphanumeric information displayed as graphics and text on the associated television set 100'. The microprocessor 110 will also respond to an appropriate input command from the user to select a broadcast program as discussed in more detail below.

Figure 9A:
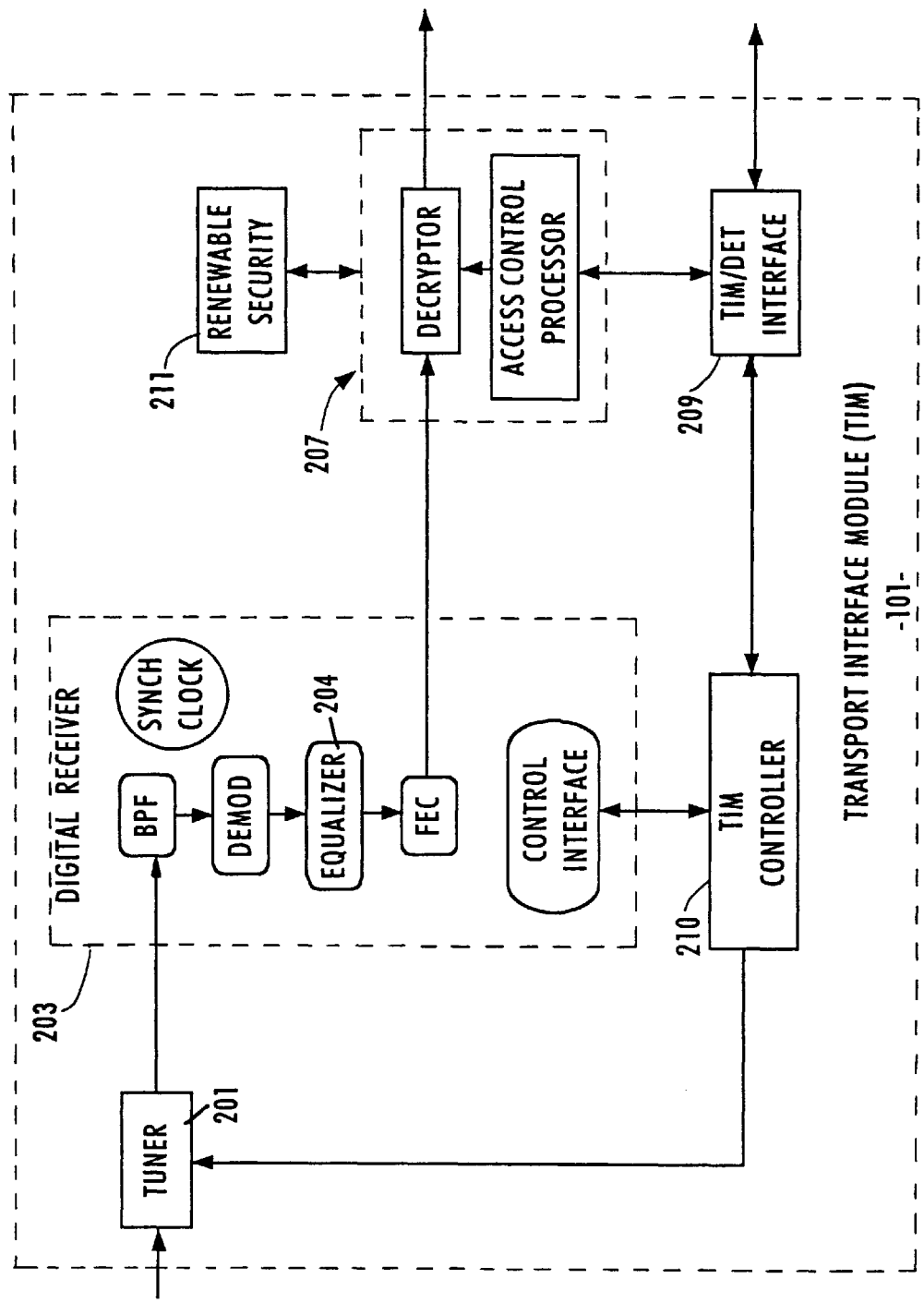
FIGS. 9A and 9B are block diagrams illustrating the elements of alternative transport interface modules for use in the terminal of FIG. 8.

FIG. 9A depicts in block diagram form the structure of a TIM 101. The structure illustrated is based in part on the current preference for the 64 QAM modulation techniques for the digital video signals in transmission system of the type shown in FIG. 6. The input to the TIM is a broadband RF signal in the 50–450 MHz range provided from a coaxial cable from the down converter. The tuner 201 selects a specific 6 MHz channel from the broadband input spectrum and presents it at an intermediate frequency to the digital communications receiver section 203.

The digital receiver 203 includes an intermediate frequency band-pass filter, a demodulator (e.g. 64 QAM), a time domain adaptive digital equalizer 204, and forward error correction circuitry. A clock circuit provides synchronization for the digital output of the demodulator, the adaptive digital equalizer, and the forward error correction circuitry. The forward error correction circuit processes the recaptured symbols (e.g. 1s and 0s) to determine if each is in the proper position in the stream.

The time domain adaptive digital equalizer 204 receives the output of the QAM demodulator. Because of the overlapping transmissions from multiple transmitter sites and multi-path delays, i.e. reflections of signals transmitted from one or more broadcast sites, the output of the demodulator will not be a clean digital pulse stream. Instead, the signal will be a composite of time delayed copies of the transmitted digital information. The time domain adaptive equalizer includes a multi-tap digital delay line. The outputs from the taps of the delay line may be weighted and summed, and the sum processed by a level detector or the like to recapture the original symbols (e.g. 1s and 0s of a digital stream). Examples of digital delay equalizers which may be used in the receivers of the present invention are described in Proakis, "Digital Communications," second edition, 1989, McGraw-Hill, Inc., chapter 6, although still other types of delay equalizers known to skilled technicians may be used.

The length of the digital delay line in equalizer 204 and the number of taps off of the digital delay line determine the delay processing window of the equalizer. In accord with the present invention, the precise window of the equalizer is selected to compensate for the longest delay interval between different transmitters that may be aligned to transmit signals to a single receiving location. In the preferred embodiment, the delay window is longer than this maximum delay by some amount chosen to permit processing of multipath delayed signals from the more distant transmitter.

In the examples discussed above relative to FIGS. 4, 5A and 5B, it was tacitly assumed that because of the directionality of the receiving antennae and the blockage of the back lobes from the secondary transmitters, virtually all receiving antennae will align with at most the primary transmission and one secondary transmission from an antenna which appears to the receiving to be behind the primary antenna. The maximum delay differential between signals received from aligned transmitter antennae therefore equals the time of propagation from the most distant secondary antenna to the location of the primary antenna. In the examples, the most distant secondary antenna is 15 miles from the primary antenna $T_p$, therefore the propagation time is 79.5 microseconds. The equalizer processing window was chosen to provide an additional 20 microseconds, to permit processing of multipath delayed signals from the distant secondary antenna, therefore the preferred delay equalizer 204 in the examples had a delay processing window of 100 microseconds.

Returning to FIG. 9A, a control interface provides appropriate control signals to the elements of the digital receiver 207 in response to instructions from the transport interface module (TIM) controller 210. The digital receiver processes signals selected from one of the RF channels by operation of the tuner 201 to capture one of the digital transport streams (e.g. 27 Mbits/s payload assuming 64 QAM). The digital processor outputs the transport stream as a corrected serial baseband digital feed.

A decryption module 207 is optional. If included, this module controls access to digital broadcast services. The decryption module 207 comprises a decryptor and an interface to a renewable security device 211. The renewable security device 211 may be a card reader for accepting a TV Pass Card. An access control processor within the decryption module 207 controls the operation of the decryptor. When properly authorized, the decryptor in module 207 decrypts payload data within packets of a selected program in the transport stream. The composite MPEG transport multiplex with appropriately decrypted components for the selected program is output from the TIM 101 to the host DET's demultiplexer 127 and decompression circuitry as shown in detail in FIG. 8. The TIM controller 210 and/or the decryption module 207 receive instructions from the CPU 105 (FIG. 8) as to channel and program selections via the TIM/DET interface 209.

The system memory 120 of the main portion of the DET 100 will store a channel map for the digital broadcast programs available through the system. For each program service, the map includes information defining a logical network channel number for the program. The logical channel number is the channel the DET will display on a front panel display (not shown) or on the screen of the associated television set 100' and is the number that the user inputs via the remote control to select the program. For each program, the map also includes RF channel information needed to tune to the RF channel carrying the program and the program number (PN) uniquely identifying the program within the multiplexed digital transport stream.

When the user selects a digital broadcast program, the microprocessor 110 in the main portion of the DET accesses the listing for that channel in the channel map stored in the system memory 120. The microprocessor 110 supplies a message containing the RF channel number and the program number (PN) to the TIM controller 210 via interface 209. In response to the RF channel number, the TIM controller 210 activates the tuner 201 to tune to the identified channel. If the program is encrypted, the TIM uses the program number, the program association table in the packet identified by PID 0 and the program map to identify the packets carrying audio, video and data (if any) for the program. If authorized to receive the program as indicated via the renewable security device 211, the decryption module 207 uses a decryption key from its memory or from the renewable security device 211 to descramble the information in the payloads of the packets of the selected program. As a result, the TIM 216 passes digital signals from the RF channel through the interface to the MPEG system demultiplexer 129 in the main portion of the DET wherein at least the information for the selected program is now in unencrypted form.

The MPEG demultiplexer 127 supplies information from the PID 0 packet, i.e. the program association table to the CPU 105. The microprocessor 110 uses the program number (PN) from the channel map stored in system memory 120 to identify the PID value for the correct program map from the program association table. The CPU 105 supplies that PID value to the MPEG demultiplexer 127. When the MPEG demultiplexer 127 receives a packet containing that PID, it supplies information from the packet identified by the PID (the program map) to the CPU. From the program map, the CPU identifies the PID values for the video and audio for the program and instructs the demultiplexer 127 to supply those packets to the respective MPEG decoders 129, 131 to begin MPEG decoding of the selected program for presentation to the user via the associated television set 100'.

Figure 9B:
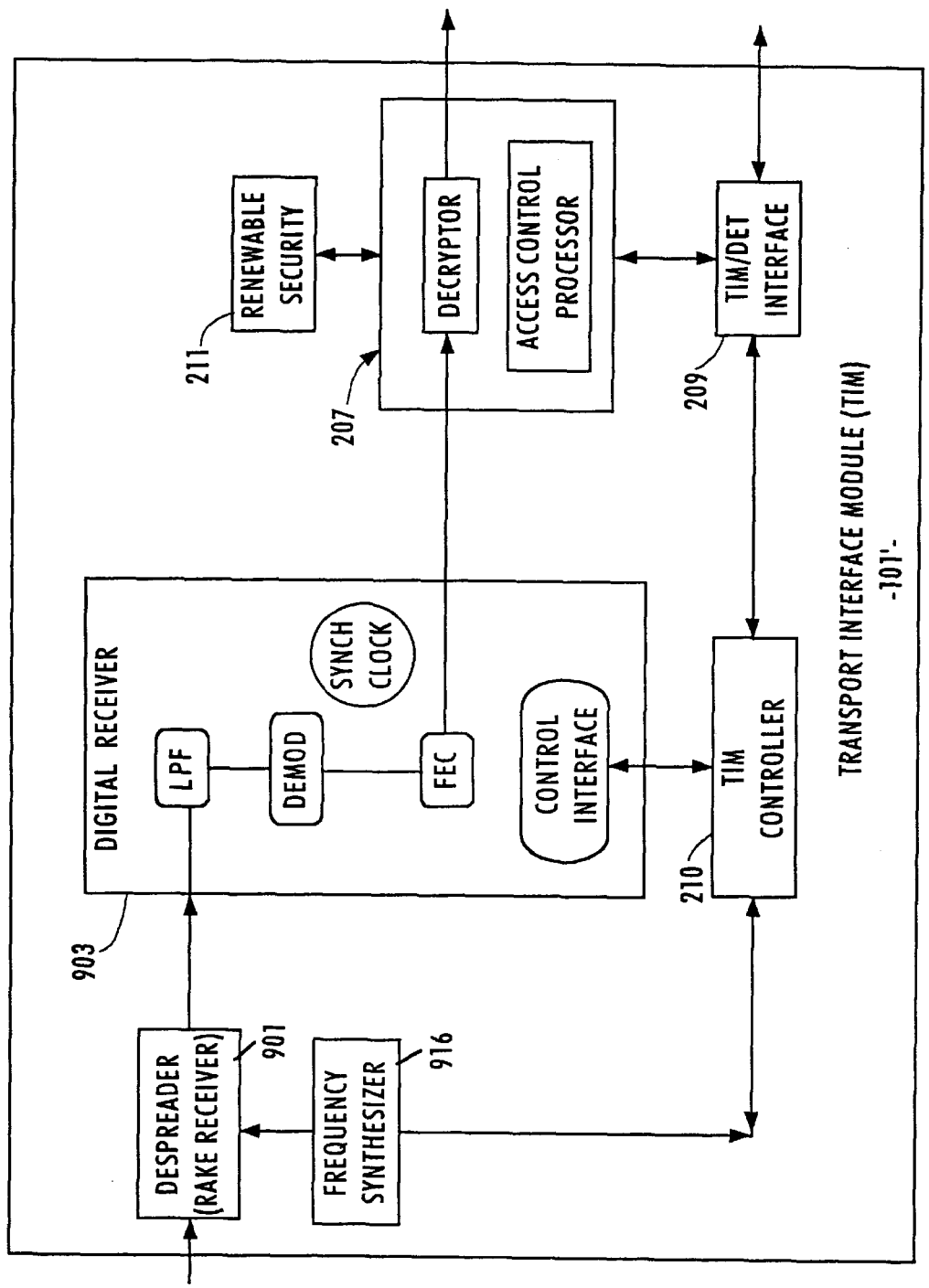

FIG. 9B discloses an alternative TIM 101' according to the present invention. The TIM 101' is adapted to receive spread spectrum signals from the transmitters disclosed in FIGS. 4 and 5. Each of the transmitters may simulcast transmit only one spread spectrum signal carrying the multiplexed channels of MPEG data. Alteratively, each of the transmitters may transmit a plurality of spread spectrum signals, each having a corresponding spreading code. In this case, the TIM 901 may selectively despread one of the spread spectrum signals to receive the corresponding set of multiplexed channels.

For example, if each of the transmitters in FIGS. 4 and 5 simulcast one spread spectrum signal carrying sixteen (16) multiplexed channels, the channel capacity for the user is sixteen channels. However, if each of the transmitters simulcast four (4) spread spectrum signals, each receiver can selectively despread one of the four spread spectrum signals carrying sixteen multiplexed channels, effectively increasing the user's channel capacity to sixty-four (64) channels.

In a spread spectrum system, a modulation technique is utilized in which a transmitted signal is spread over a wide frequency band within the communication channel. The frequency band is much wider than the minimum bandwidth required to transmit the information being sent. Generally, three types of spread spectrum communication techniques exist. These include:

Direct Sequence

The modulation of a carrier by a digital code sequence whose bit rate is much higher than the information signal bandwidth. Such systems are referred to as "direct sequence" modulated systems.

Hopping

Carrier frequency shifting in discrete increments in a pattern dictated by a code sequence. These systems are called "frequency hoppers." The transmitter jumps from frequency to frequency within some predetermined set; the order of frequency usage is determined by a code sequence. Similarly "time hopping" and "time-frequency hopping" have times of transmission which are regulated by a code sequence.

Chirp

Pulse-FM or "chirp" modulation in which a carrier is swept over a wide band during a given pulse interval.

Information (i.e., the message signal) can be embedded in the spread spectrum signal by several methods. One method is to add the information to the spreading code before it is used for spreading modulation. This technique can be used in direct sequence and frequency hopping systems. It will be noted that the information being sent must be in a digital form prior to adding it to the spreading code. Alternatively, the information or message signal may be used to modulate a carrier before spreading it.

Thus, a spread spectrum system must have two properties: (1) the transmitted bandwidth should be much greater than the bandwidth or rate of the information being sent and (2) some function other than the information being sent is employed to determine the resulting modulated channel bandwidth.

Spread spectrum communication systems can be implemented as multiple access systems in a number of different ways. One type of multiple access spread spectrum system is a code division multiple access (CDMA) system. CDMA spread spectrum systems may use direct sequence (DS-CDMA) or frequency hopping (FH-CDMA) spectrum spreading techniques. FH-CDMA systems can further be divided into slow frequency hopping (SFH-CDMA) and fast frequency hopping (FFH-CDMA) systems. In SFH-CDMA systems, several data symbols representing a sequence of data bits to be transmitted modulate the carrier wave within a single hop; in FFH-CDMA systems, the carrier wave hops several times per data symbol.

In a SFH-CDMA system, multiple communication channels are accommodated by the assignment of portions of a broad frequency band to each particular channel. For example, a communication between two communication units in a particular communication channel is accomplished by using a frequency synthesizer to generate a carrier wave in a particular portion of a predetermined broad frequency band for a brief period of time. The frequency synthesizer uses an input spreading code to determine the particular frequency from within the set of frequencies in the broad frequency band at which to generate the carrier wave. Spreading codes are input to the frequency synthesizer by a spreading code generator. The spreading code generator is periodically clocked or stepped through different transitions which causes different or shifted spreading codes to be output to the frequency synthesizer. Therefore, as the spreading code generator is periodically clocked, the carrier wave is frequency hopped or reassigned to different portions of the frequency band. In addition to hopping, the carrier wave is modulated by data symbols representing a sequence of data bits to be transmitted. A common type of carrier wave modulation used in SFH-CDMA systems is M-ary frequency shift keying (MFSK), where $k=\log_2 M$ data symbols are used to determine which one of the M frequencies is to be transmitted.

Multiple communication channels are allocated by using a plurality of spreading codes. As a result, transmitted signals are in the same broad frequency band of the communication channel, but within unique portions of the broad frequency band assigned by the unique spreading codes. These unique spreading codes preferable are orthogonal to one another such that the cross-correlation between the spreading codes is approximately zero. Particular transmitted signals can be retrieved from the communication channel by despreading a signal representative of the sum of signals in the communication channel with a spreading code related to the particular transmitted signal which is to be retrieved from the communication channel. Further, when the spreading codes are orthogonal to one another, the received signal can be correlated with a particular spreading code such that only the desired signal related to the particular spreading code is enhanced while the other signals are not enhanced.

According to the present invention, frequency hopping spread spectrum is preferably utilized in the simulcast transmission system. Additional details of the frequency hopping spread spectrum transmission techniques are disclosed in commonly-assigned, copending application Ser. No. 08/405,685, filed Mar. 17, 1995, now U.S. Pat. No. 5,659,353, entitled "Television Distribution System and Method", the disclosure of which is incorporated in its entirety herein by reference. Alternative forms of spread spectrum processing may be used, however, such as code division multiple access (CDMA).

Returning to FIG. 9B, the TIM 101' is substantially similar to the TIM 101 shown in FIG. 9A, except for variations described below to accommodate spread spectrum signals. The input to the TIM 101' is a spread spectrum signal in the 50–450 MHz range provided from a coaxial cable from the down converter. The despreader 901 selects a specific 6 MHz channel from the broadband input spectrum under control of the frequency synthesizer 916 and presents it at an intermediate frequency to the digital communications receiver section 903.

As discussed above with respect to FIG. 6, the spaced antennas simulcast transmit the same signal to provide overlapping propagation areas. In order to resolve the time-delayed copies of the transmitted spread spectrum signal received at the receiver site, the despreader 901 includes a delay processor, preferably a rake receiver, to acquire an optimized representation of the multiple time-delayed copies of the transmitted signal received at the receiver. When the despreader 901 is tuned to receive Channel 1 through operation of the TIM controller 210, the synthesizer 916 executes the same frequency hopping pattern as the local oscillator at the transmission site and is synchronized with that oscillator in a known manner. As a result, that spread spectrum receiver 901 outputs a faithful reproduction of Channel 1.

Assuming that the transmitted signal representing Channel 1 is encountering a 2 microsecond delay a duplicate pattern is created which lags the primary pattern by 2 microseconds. In order to obtain an advantage from the multi-path signals, this signal is utilized by the rake receiver in the despreader 901 in response to the signals from the frequency synthesizer 916 running the Channel 1 sequence. The rake receiver internal to the despreader 901 will use the despreading code twice with the second occurrence offset by the t1–2 microsecond delay. As a result, the duplicate pattern having the 2 microsecond delay is despread by the rake receiver. The rake receiver may be designed to select the strongest of the despread signals having different multipaths, or alternatively may combine the despread signals to reduce the number of bit errors in the received signal. Additional details of the rake receiver are disclosed in the above-identified copending application Ser. No. 08/405,685, filed Mar. 17, 1995 (attorney docket No. 680-117), the disclosure of which is incorporated herein by reference.

Thus, the rake receiver in the despreader 901 is functionally similar to the time domain adaptive digital equalizer 204 in that both obtain an optimum representation of a transmitted signal from the plurality of time delayed copies. The rake receiver will therefore have a similar delay processing window to compensate for the largest delay interval between different transmitters that may be aligned to transmit signals to a single receiving location, disclosed above as 100 microseconds.

The despreader 901 outputs the despread signal representing an optimized representation of the received signals to a digital receiver 903 that includes a low-pass filter, a demodulator (e.g., 64 QAM), and forward error correction circuitry. A clock circuit provides synchronization for the digital output of the demodulator, despreader, and the forward error correction circuitry.

The system memory 120 of the main portion of the DET 100 will store a channel map for the digital broadcast programs available through the system. For each program service, the map includes information defining a logical network channel number for the program. The logical channel number is the channel the DET will display on a front panel display (not shown) or on the screen of the associated television set 100' and is the number that the user inputs via the remote control to select the program. For each program, the map also includes RF channel information needed to tune to the RF channel carrying the program and the program number (PN) uniquely identifying the program within the multiplexed digital transport stream.

When the user selects a digital broadcast program, the microprocessor 110 in the main portion of the DET accesses the listing for that channel in the channel map and the despreading code table stored in the system memory 120. The microprocessor 110 supplies a message containing the RF channel number and the frequency hopping code to the TIM controller 210 via interface 209. In response to the RF channel number, the TIM controller 210 activates the frequency synthesizer 916 to synchronize the frequency hopping code fed from the memory 120 through the microprocessor to the frequency synthesizer. The frequency synthesizer 916 feeds the code to the despreader 901 which in turn delivers the selected channel to the LPF in the digital receiver 903. If the program is encrypted, the TIM uses the program number, the program association table in the packet identified by PID 0 and the program map to identify the packets carrying audio, video and data (if any) for the program. If authorized to receive the program as indicated via the renewable security device 211, the decryption module 207 uses a decryption key from its memory or from the renewable security device 211 to descramble the information in the payloads of the packets of the selected program. As a result, the TIM 101 passes digital signals from the RF channel through the interface to the MPEG system demultiplexer 129 in the main portion of the DET wherein at least the information for the selected program is now in unencrypted form.

The above discussion has concentrated on the preferred embodiment which broadcasts video programming. It should be noted, however, that the system may transport other types of programming, such as audio, data and/or telemetry.

While this invention has been described in connection with what is presently considered to be the preferred embodiment, it is to be understood that the invention is not limited to the disclosed embodiment, but, on the contrary, is intended to cover various modifications and equivalent arrangements included within the spirit and scope of the appended claims.

We claim:

1. In a reception area having overlapping radio frequency propagation areas generated by corresponding transmitting sites each simulcast transmitting a signal including multiplexed channels of compressed digital broadband data, a method comprising the steps of:

(a) receiving a signal containing a plurality of time offset counterparts of said transmitted simulcast signal at a receiving site within said reception area;

(b) processing said time offset counterparts of the received signal to acquire a single copy of a signal corresponding to a selected one of the multiplexed channels; and (c) presenting a selected portion of the compressed digital broadband data contained in the acquired single copy;

wherein the transmitted signal is a spread spectrum signal, the processing step comprising the step of spread spectrum processing the received signal in accordance with a selected spread spectrum code to develop a composite signal as said single copy.

2. A method as in claim 1, wherein:

said multiplexed channels include respective multiplexed streams of compressed digital broadband data, each of said multiplexed streams representing a plurality of programs; and the presenting step comprises (a) selecting the selected portion of the compressed digital broadband data for one program from one of said multiplexed streams of digital data, and (b) reproducing the selected portion of the compressed digital broadband data as sensorially perceptible information.

3. A method as in claim 1, wherein said compressed digital broadband data comprises video data.

4. A method as recited in claim 1, wherein said compressed broadband data comprises MPEG-encoded data.

5. A method as recited in claim 1, wherein each of said transmitting sites transmit a plurality of signals having corresponding spread spectrum codes, the processing step further comprising the step of selecting the spread spectrum code from the plurality of spread spectrum codes to acquire the single copy.

6. A receiver system for receiving a simulcast transmitted signal including multiplexed channels of compressed digital broadband data, comprising:

an antenna receiving a plurality of time offset counterparts of the transmitted signal;

a delay processor for processing said time offset counterparts of the received signal to acquire a single copy of a signal corresponding to a selected one of the multiplexed channels; and a processor presenting a selected portion of the compressed digital broadband data contained in the acquired signal;

wherein the transmitted signal is a spread spectrum-processed signal, the delay processor comprising a spread spectrum processor for despreading a received signal, comprising the time delayed copies of the transmitted signal, in accordance with a despreading code.

7. A system as in claim 6, wherein said processor comprises:

a demultiplexer for selecting predetermined digital data from the acquired signal; and a decoder processing the predetermined digital data to produce a signal for driving an output device.

8. A system as in claim 6, further comprising an output device responsive to information presented by said processor to output information to a user in sensorially perceptible form.

9. A system as in claim 8, wherein said output device comprises a video display.

10. A system as in claim 6, wherein the spread spectrum processor comprises a rake receiver.

11. A system as in claim 6, further comprising a memory storing a plurality of despreading codes.

12. A receiver system comprising:

an antenna receiving multiple time displaced copies of a signal including multiplexed channels from a plurality of spaced apart transmitters which provide overlapping broadcasts of the signal including multiplexed channels, each multiplexed channel containing digitized and compressed broadband information relating to a plurality of programs;

a delay signal processing circuit responsive to signals received by the antenna for processing said multiple time displaced copies within a predetermined delay processing window of signals in a selected one of the multiplexed channels, to acquire a single copy of a signal corresponding to the selected one of the multiplexed channels; and a digital processor responsive to selected digitized and compressed broadband information contained in at least a portion of the acquired single copy to present a selected program;

wherein the predetermined delay processing window of the delay signal processing circuit has a value equal to or greater than the difference in propagation time to the antenna from two of the spaced apart transmitters.

13. A receiver system as in claim 12, wherein the predetermined delay processing window of the delay signal processing circuit has a value of approximately 100 microseconds.

14. A receiver system as in claim 12, wherein the delay signal processing circuit comprises a time delay equalizer.

15. A receiver system as in claim 12, wherein the delay signal processing circuit comprises a rake receiver.

16. A receiver as in claim 12, wherein the multiplexed channels have different frequencies, said receiver further comprising:

a channel frequency selector for supplying signals from a selected frequency channel; and a demodulator demodulating signals from the selected frequency channel and supplying the demodulated signals for processing by the delay signal processing circuit.

17. A receiver as in claim 16, wherein the demodulator comprises a QAM demodulator.

18. A receiver as in claim 16, wherein the digital processor comprises a digital audio/video decoder for decompressing the selected digitized and compressed broadband information to produce a decompressed video signal and a decompressed audio signal.

19. A receiver as in claim 18, wherein the audio/video decoder comprises:

an MPEG video decoder;

an MPEG audio decoder; and an MPEG demultiplexer selectively routing information from MPEG encoded video and audio packets carried on the selected channel to the MPEG video decoder and the MPEG audio decoder, respectively.

* * * * *